United States Patent [19]

Ishioka et al.

[11] Patent Number: 5,987,001
[45] Date of Patent: Nov. 16, 1999

[54] OPTICAL DISC DRIVE APPARATUS WITH DISC CHANGER

[75] Inventors: Kiyoshi Ishioka, Hirakata; Toru Tanaka, Kobe; Jun Kitamura, Katano, all of Japan

[73] Assignee: Matsushita Electric Industrial Co., Ltd., Kadoma, Japan

[21] Appl. No.: 08/947,150

[22] Filed: Oct. 8, 1997

[30] Foreign Application Priority Data

Oct. 11, 1996 [JP] Japan .................................. 8-269599
Oct. 14, 1996 [JP] Japan .................................. 8-270541

[51] Int. Cl.⁶ .................................................. G11B 17/04
[52] U.S. Cl. ........................................ 369/192; 360/99.06
[58] Field of Search ............................ 360/96.06, 98.04, 360/99.06, 99.09, 157; 369/34, 36, 37, 39, 75.2, 77.1, 77.2, 178, 192, 292

[56] References Cited

U.S. PATENT DOCUMENTS

| | | | |
|---|---|---|---|
| 4,654,840 | 3/1987 | Takahashi | 369/75.2 |
| 4,797,865 | 1/1989 | Mai et al. | 369/39 |
| 5,025,338 | 6/1991 | Sone et al. | 360/99.06 |
| 5,140,579 | 8/1992 | Suzuki et al. | 369/77.1 |
| 5,459,703 | 10/1995 | Tanaka | 369/36 |
| 5,790,508 | 8/1998 | Chen | 369/178 |

FOREIGN PATENT DOCUMENTS

| | | |
|---|---|---|
| 3-216857 | 9/1991 | Japan . |
| 5-96936 | 12/1993 | Japan . |
| 6-14423 | 2/1994 | Japan . |
| 6-259865 | 9/1994 | Japan . |

Primary Examiner—David L. Ometz
Assistant Examiner—Angel Castro
Attorney, Agent, or Firm—Wenderoth, Lind & Ponack, L.L.P.

[57] ABSTRACT

An optical disc drive apparatus including a main tray having a stack of subtrays mounted thereon and movable between withdrawn and inserted positions. When the main tray is moved to the inserted position, the subtrays stacked thereon are held at a stand-by position and a selected one of the subtrays is ready to be drawn towards a loaded position so that an optical disc resting on the selected one of the subtrays can be clamped in position and optically read out. When an optical disc resting on one of the subtrays other than the uppermost subtray then held at the loaded position is desired to be removed or replaced, not only can such one of the subtray be returned from the loaded position to the stand-by position, the main tray is allowed to withdraw from the inserted position back to the withdrawn position carrying such one of the subtrays and the subtray or subtrays positioned immediately thereabove while leaving the subtray or the subtrays positioned above such one of the subtrays at the stand-by position, so that such one of the subtrays can readily be exposed to the outside for removal or replacement of the optical disc resting thereon.

8 Claims, 14 Drawing Sheets

Fig. 1
Fig. 1A
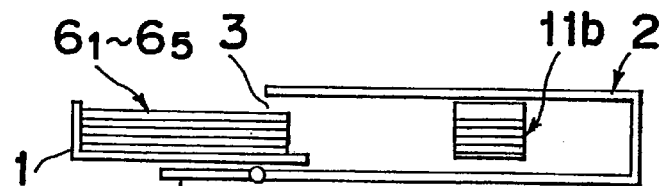
Fig. 1B
Fig. 1C
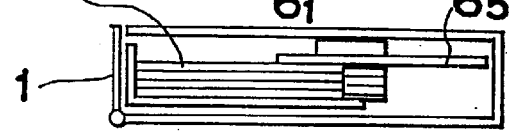
Fig. 1D
Fig. 1E
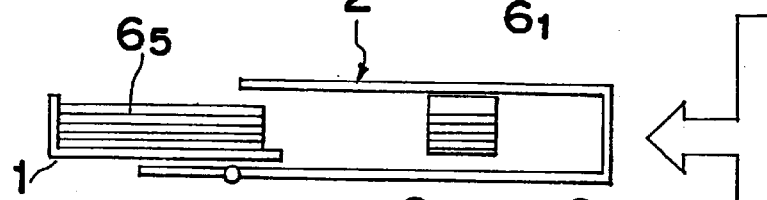
Fig. 1F
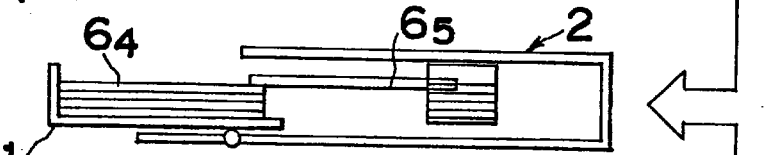
Fig. 1G
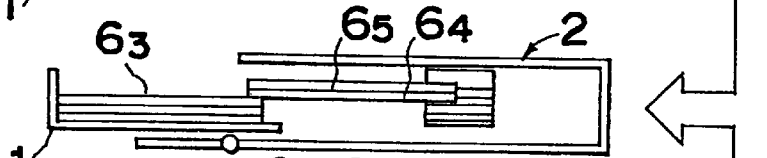
Fig. 1H
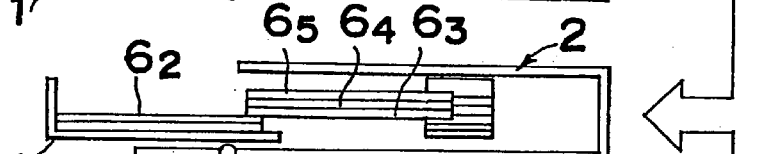
Fig. 1I
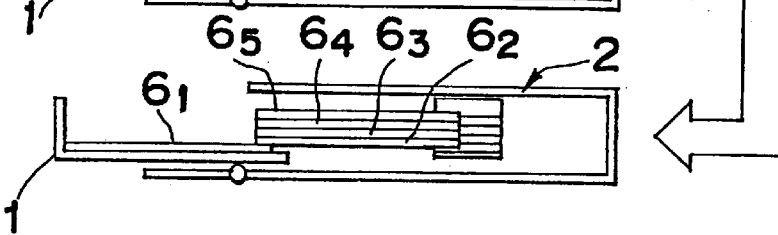

Fig. 14
Fig. 14A
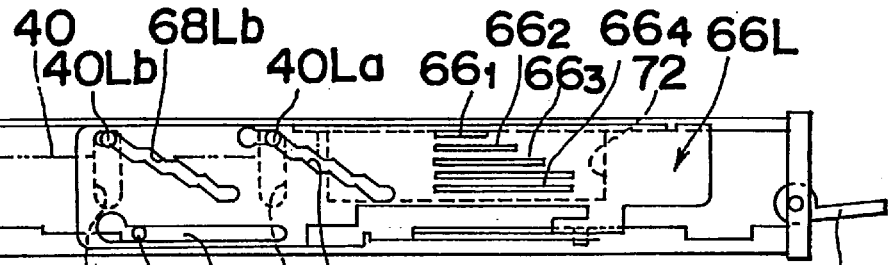
Fig. 14B
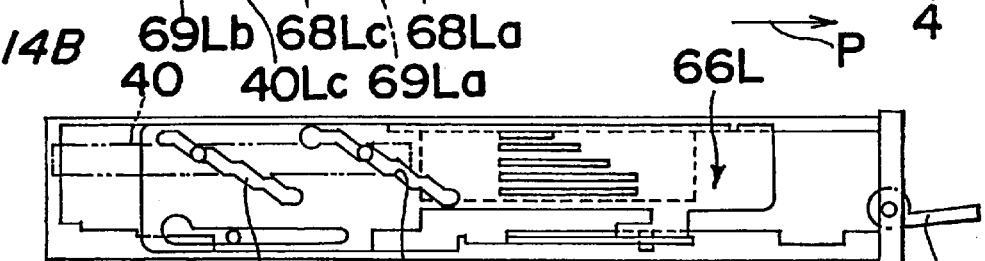
Fig. 14C
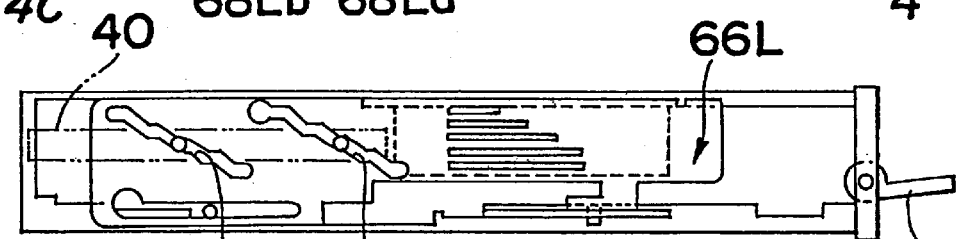
Fig. 14D
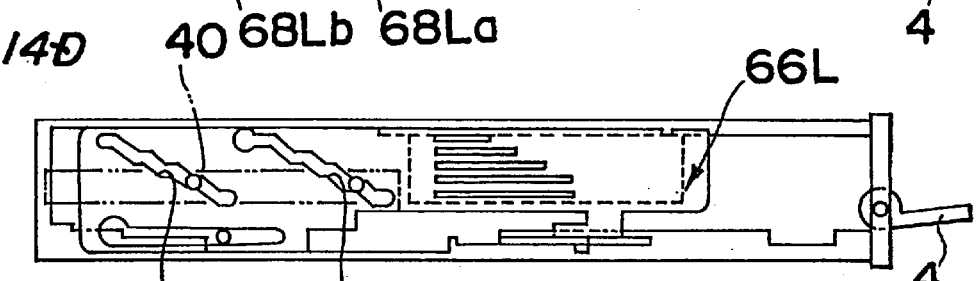
Fig. 14E
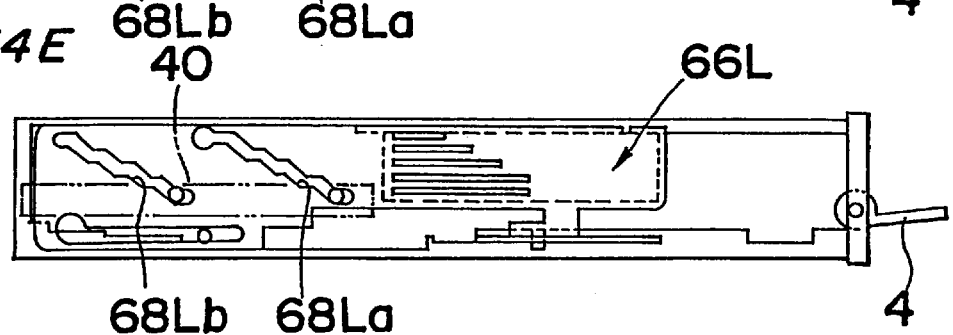

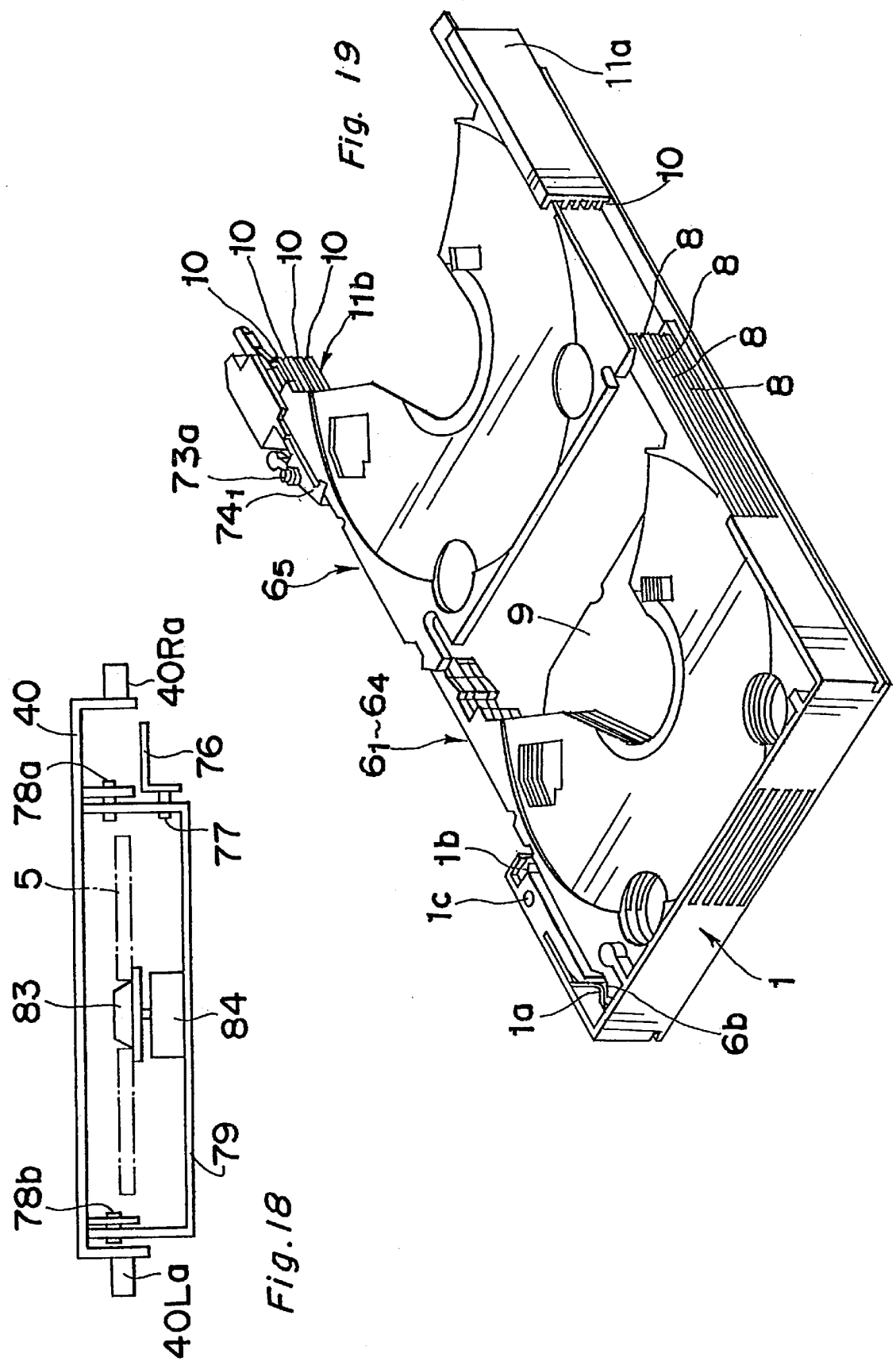

5,987,001

OPTICAL DISC DRIVE APPARATUS WITH DISC CHANGER

BACKGROUND OF THE INVENTION

1. Field of the Invention

The present invention generally relates to an optical disc drive apparatus and, more particularly, the optical disc drive apparatus of a type having a disc changer capability for recording and/or reproducing information on and from a selected one of a plurality of optical discs resting on drawable subtrays stacked on a main tray.

In particular, the optical disc drive apparatus of the present invention is suited for use in a personal computer and is so sized and so configured as to permit the replacement of the existing single disc drive in the personal computer.

2. Description of the Prior Art

With the advent of the age of personal computers, a CD-ROM drive has come into widespread use as a computer peripheral device and has now come standard with a majority of the computers. In addition, it is not rare for a single computer user to have a number of optical discs in possession. In this context, user demands are now increasing for CD-ROM drives having an automatic disc changing capability by which a plurality of optical discs can be loaded automatically one at a time to a position where access is made by an optical information read-out device, and also having a high speed information recording and/or reproducing capability which can be accomplished by, for example, increasing the speed of rotation of the optical disc.

On the other hand, in most of the desk-top personal computers, a CD-ROM drive or any other disc drive is installed in a housing space generally known as a "5-inch bay". The opening leading to this housing space is of a standard size generally known as a "5-inch half-height" size, and any peripheral device that is desired to be accommodated in the 5-inch bay must have a maximum size of 146 mm in width and 41.3 mm in height. Accordingly, the CD-ROM drive having a built-in automatic disc changer must also satisfy the size requirement if it is desired to be installed in the 5-inch bay. If indiscriminate design is made to allow the drive apparatus to accommodate an increased number of optical discs, the resultant drive would no longer satisfy the size requirement.

In any event, the CD-ROM drive having an automatic disc changing capability and satisfying the size and speed requirements, i.e., capable of being installed in the 5-inch bay is well known in the art. By way of example, the Japanese Laid-open Patent Publication No. 3-216857, published Sep. 24, 1991, discloses an optical disc drive apparatus comprising a main tray supported for movement between withdrawn and inserted positions relative to the drive housing and having a plurality of subtrays stacked thereon each for support thereon an optical disc. This optical disc drive apparatus is so designed that when the main tray is moved to the inserted position with the stacked subtrays held consequently at a stand-by position, a selected one of the subtrays then held at the stand-by position can be drawn towards a loaded position where the optical information read-out device makes access to the optical disc resting on such selected subtray.

According to this publication, the main tray is formed with grooves for holding the subtrays in equidistantly spaced relation to each other. When the optical disc resting on an arbitrarily chosen one of the subtrays then held at the stand-by position with the main tray held at the inserted position is desired to be removed or replaced with a different optical disc, the main tray carrying the entire number of the subtrays must be withdrawn to the withdrawn position so that the optical disc on the arbitrarily chosen subtray can be removed. After this removal has been made, the main tray must again be moved to the inserted position.

A similar optical disc drive apparatus is also disclosed in the Japanese Laid-open Patent Publication No. 6-259865, published Sep. 16, 1994. This known apparatus makes use of an elevating stocker positioned on one side of a disc playback position remote from the withdrawn position for the main tray and is so designed and so configured that, after a tray with a carriage or subtray thereon has been moved to the inserted position, the optical disc resting on the carriage or subtray is drawn to a playback position where it is played back. The optical disc having been played back is then transported together with the subtray towards the elevating stocker where it is accommodated. The stocker disclosed therein has a capacity of accommodating a plurality of, for example, 7, subtrays and, accordingly, by stacking the subtrays, each having an optical disc resting thereon, within the stocker, an arbitrarily chosen one of the subtrays can be drawn to the playback position that is defined intermediate between the inserted position for the tray and the stocker.

According to this second-mentioned publication, separate drive motors are required for driving the tray and for selectively lowering and lifting the stocker. In addition, the stocker is supported by a movable members and, therefore, when an impact acts on the apparatus during, for example, transport of the apparatus, not only may lifting pins be disengaged from the stocker, but also the movable member may be damaged.

The Japanese Laid-open Utility Model Publication No. 5-96936, published Dec. 27, 1993, discloses the design in which the space between the neighboring subtrays stacked on the main tray, which is exhibited when the main tray is moved to the stand-by position, is minimized to render the apparatus as a whole to have a reduced height, but in which the space between the neighboring subtrays, which is exhibited when the subtray positioned between those neighboring subtray has been moved to the loaded position with a part thereof situated between such neighboring subtrays, is expanded to allow the optical disc to be rotated within such space.

A combination of the Japanese Laid-open Patent Publications No. 9-7281, published Jan. 10, 1997; No. 9-44962, published Feb. 14, 1997; No. 9-91834, published Apr. 4, 1997; and No. 9-139004, published May 27, 1997, which corresponds to the U.S. patent application Ser. No. 08/670, 100 filed Jun. 25, 1996 and assigned to the same assignee of the present invention, the disclosure of which is herein incorporated for all purposes of the present invention, discloses an optical disc drive apparatus including a main tray having a stack of subtrays mounted thereon and movable between withdrawn and inserted positions, means for moving the main tray from the withdrawn position towards the inserted position, means for drawing an arbitrarily chosen one of the subtrays from a stand-by position towards a loaded position defined above a traverse plate or clamp support plate while the main tray is held at the inserted position, a clamp device including a clamper for clamping an optical disc resting on the subtray then drawn to the loaded position between the clamper and a turntable on the traverse plate for rotation together therewith, and an elevating means including an elevating table for selectively lifting and lowering the loading drive means in a direction in which the subtrays are stacked on the main tray so that the arbitrarily chosen subtray may be drawn from the stand-by position towards the loaded position.

With this design, when an optical disc resting on one of the subtrays other than the uppermost subtray then held at the loaded position is desired to be removed or replaced, not only can such one of the subtray be returned smoothly from the loaded position to the stand-by position, but the main tray is allowed to withdraw from the inserted position back to the withdrawn position carrying such one of the subtrays and the subtray or subtrays positioned immediately thereabove while leaving the subtray or the subtrays positioned above such one of the subtrays at the stand-by position in a substantially horizontal posture, so that such one of the subtrays can readily be exposed to the outside for removal or replacement of the optical disc resting thereon.

The optical disc drive apparatus disclosed in the above mentioned US application is satisfactorily designed and configured so as to meet the size requirement, i.e., capability of being installed in the 5-inch bay in any existing computer, and also to meet the speed requirement. However, the optical disc drive apparatus of the U.S. Ser. No. 08/670,100 has subsequently been found having improvements to be done for the purpose of accomplishing a highly reliable information recording and/or reproduction.

More specifically, the turntable, a spindle drive motor for driving the turntable, an optical pick-up and the traverse plate or clamp support plate supporting thereon those component parts are supported by the elevating table for movement up and down relative to the chassis. The elevating table is elevatable in a vertical direction substantially parallel to the plane of rotation o the optical disc between a lowered position and an elevated position.

In order to permit the optical pick-up to read information from the optical disc on one of the subtrays which has been moved from the stand-by position to the loaded position, the turntable and the traverse plate angularly movable up and down about clamp support pins serve to lift the optical disc above the subtray to allow the optical disc to be clamped between the clamper and the turntable in readiness for the drive of the optical disc in one direction by means of the spindle drive motor.

In other words, the traverse plate having the turntable mounted thereon has a rear end pivotally connected to the clamp support pins that define a common axis about which the traverse plate can be pivoted. This traverse plate is retained by the elevating table movable up and down within the chassis so that when the elevating table moves up and down, the traverse plate can be pivoted about the common axis connecting between the clamp support pins. When the optical disc on any one of the subtrays is to be moved from the stand-by position towards the loaded position or from the loaded position towards the stand-by position, the traverse plate is pivoted in one direction with its front end lowering to provide a space above the turntable through which the optical disc can be moved without being hampered by component parts positioned therearound. On the other hand, when the optical disc on any one of the subtrays is to be reproduced, the traverse plate is pivoted in the opposite direction with the front end thereof lifted so that the optical disc moved to the loaded position from the stand-by position can be clamped between the clamper and the turntable.

The pivot of the traverse plate is accomplished when the clamp device driven by a drive motor through a drive transmission mechanism such as a train of gears acts on the traverse plate. In this suggested disc drive apparatus designed to accommodate the optical discs as many as possible within the maximum available volume of the disc chamber together with the main tray and the associated subtrays, the clamp device has to be disposed at a position laterally offset from the optical disc held at the loaded position, that is, at a position sufficient to permit the clamp device to act on either a left side wall or a right side wall of the traverse plate so that it will not interfere with the optical disc then held at the loaded position.

Where the point of the traverse plate on which the clamp device acts to pivot the traverse plate is defined at the position offset laterally from a relatively heavy component part such as the turntable and the spindle drive motor, for example, at the right side wall of the traverse plate, it may occur that the traverse plate when being angularly moved by the action of the clamp device about the common axis between the clamp support pins may be deformed, i.e., skewed or tilted sidewise because of a bias of load imposed on the right side wall of the traverse plate. In other words, when the traverse plate is being pivoted while the clamp device acts on the right side wall of the traverse plate, the traverse plate will be pivoted having been skewed relative to a plane of rotation of the optical disc.

Because of the skew tending to occur during the pivotal movement of the traverse plate, the turntable mounted on the traverse plate correspondingly tilts. Once this occurs, the optical disc clamped between the turntable and the clamper will undergo a fluctuated rotation about the spindle, making it difficult for the optical pick-up assembly to read information accurately from the optical disc.

Also, where the information reading speed is to be increased to meet the market demands, the speed of drive of the optical disc must be increased. However, by the reason associated with manufacture of optical discs and/or by reason of change in environment, some of the optical discs manufactured may have a center hole slightly offset from the position where it ought to occupy and/or a bias in mass distributed circumferentially thereof, a high speed rotation of the optical disc will bring about a relatively large centrifugal force. The larger the centrifugal force, the more considerably the traverse plate is vibrated. This is because of the presence of a gap between the chassis and the elevating table supporting the disc clamp device and the traverse plate. The presence of the gap tends to allow the elevating table 40 to undergo a repeated lateral displacement relative to the chassis under the influence of such relatively large centrifugal force. This problem also results in failure of the optical pick-up assembly to accomplish an accurate reading of information from the optical disc.

SUMMARY OF THE INVENTION

In view of the foregoing, the present invention is intended to provide an improved optical disc drive apparatus of a type having an automatic disc changing capability, which can accommodate a maximized number of optical discs in a limited space without the reliability of operation thereof being sacrificed.

Another important object of the present invention is to provide an improved optical disc drive apparatus of the type referred to above, wherein a traverse plate restraint is employed to avoid any possible lateral displacement of the traverse plate to thereby avoid generation of obnoxious sounds.

In order to accomplish these and other objects of the present invention, there is provided an optical disc drive apparatus which comprises a main tray having a stack of subtrays mounted thereon and movable between withdrawn and inserted positions. The stack of the subtrays is held at a stand-by position when the main tray is moved to the inserted position. The apparatus also comprises means for drawing an arbitrarily chosen one of the subtrays from the stand-by position towards a loaded position while the main tray is held at the inserted position, an elevating table movable between lowered and elevated positions in a direction substantially perpendicular to a plane of rotation of the optical disc, and a traverse plate having front and rear ends opposite to each other and also having side walls opposite to each other. The traverse plate is carried by the elevating table at the front end of the elevating table and pivotable with its rear end angularly moved up and down. A turntable rotatably is mounted on the traverse plate for clamping the optical disc on the arbitrarily chosen subtray in cooperation with a clamping device. The traverse plate also supports thereon a spindle drive motor for driving the turntable to rotate the optical disc.

The clamping device is carried by the elevating table and movable up and down within a chassis, which surrounds the clamping device and the traverse plate, for selecting one of the subtrays and also the optical disc resting on the selected subtray. Urging means are provided for urging the elevating table towards the chassis in two directions perpendicular to each other, to substantially eliminate the problem associated with the lateral displacement of the traverse plate and, hence, the problem associated with the failure of the optical pick-up assembly to record or reproduce information from the optical disc.

Preferably, the urging means comprises side and rear leaf springs each secured at a generally intermediate portion thereof to a different portion of the traverse plate. In such case, each of the side and rear leaf springs has opposite ends held in contact with a different portion of the chassis so that the traverse plate can be urged in the respective directions to minimize or substantially eliminate gaps which would be found between the perimeter of the traverse plate and that of the chassis.

Also, in order to substantially eliminate the problem associated with the skew of the traverse plate, the traverse plate having left and right arms protruding outwardly from the front end thereof is connected with the elevating table with the left and right arms pivoted to respective portions of the elevating table through associated pivot pins that define an axis about which the traverse plate pivots. Preferably, one of the pivot pins positioned on one side adjacent the clamp drive means, which is disposed adjacent one of the opposite side walls of the traverse plate for driving the traverse plate to pivot about the axis, is located at a level lower than that of the other of the pivot pins remote from the clamp drive means.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIGS. 1A to 1D are schematic diagrams showing the sequence of how a main tray having a stack of subtrays mounted thereon is moved from a withdrawn position to an inserted position relative to a drive housing;

FIGS. 1E to 1I are schematic diagrams showing how the subtrays stacked on the main tray are when optical discs resting on the subtrays are to be removed or replaced, respectively, in accordance with a disc changing method of the present invention;

FIGS. 14A to 14E are views similar to FIGS. 13A to 13E, respectively, showing the opposite, left guide plate slidable along a left side wall of the housing in unison with the right guide plate;

FIG. 18 is a schematic front elevational view of the optical disc drive apparatus as viewed from a front opening through which a stack of optical discs on a main tray are inserted into the disc chamber, showing how a traverse plate is supported relative to the elevating table; and FIG. 19 is a perspective view of the main tray as withdrawn to the withdrawn position leaving only the uppermost subtray at the stand-by position inside the drive housing;

DETAILED DESCRIPTION OF THE EMBODIMENT

While various components of the optical disc drive apparatus according to the present invention will be described later item by item under separate headings, the principle thereof will first be described with reference to FIGS. 1 to 19.

Figure 2:
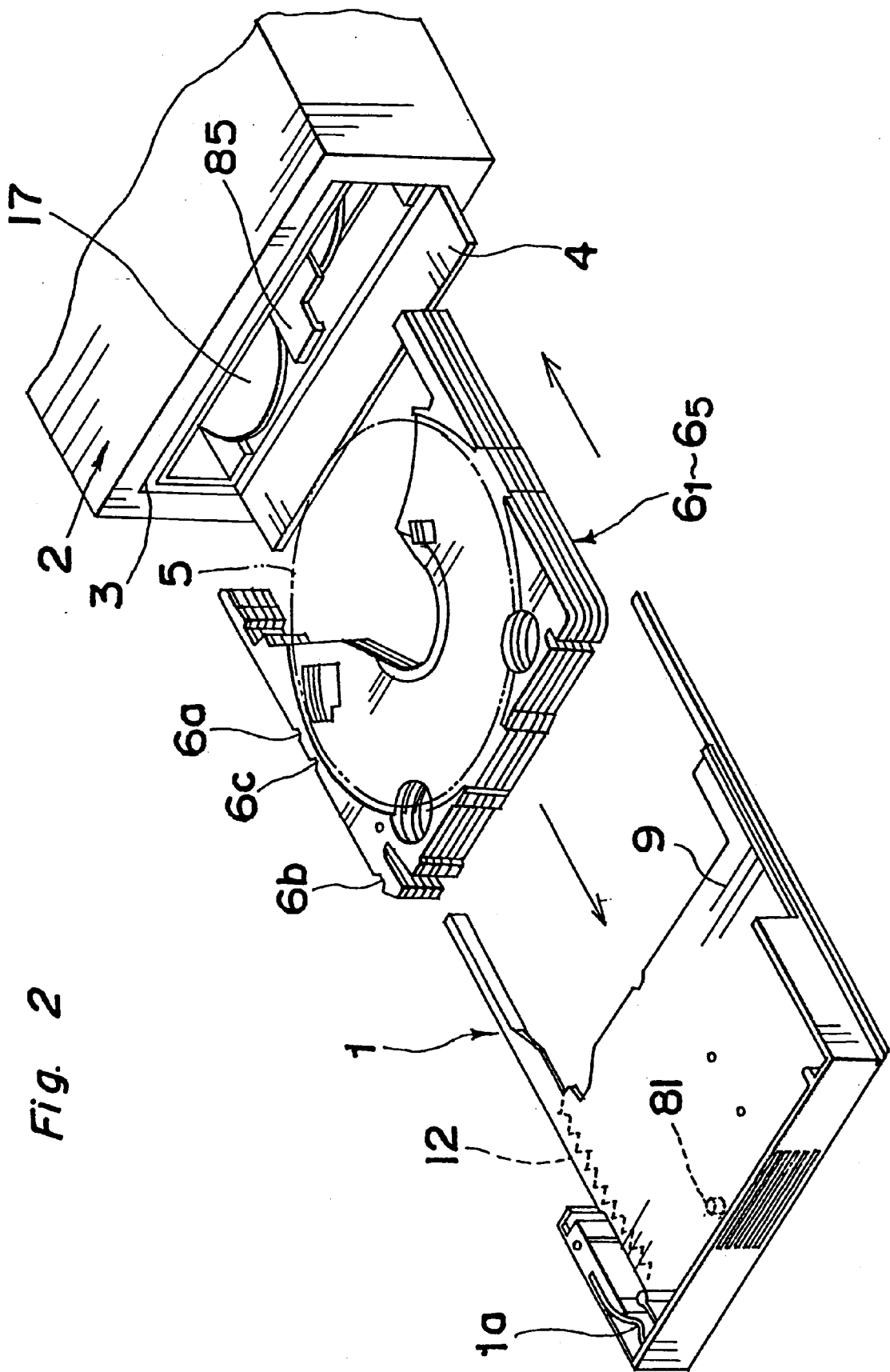
FIG. 2 is a schematic perspective view showing an optical disc drive apparatus embodying the present invention with the main tray, the stacked subtrays and a portion of the drive housing shown as separated from each other.

As best shown in FIG. 2, the optical disc drive apparatus comprises a drive housing 2 of a generally rectangular box-like configuration having a disc chamber defined therein and also having a generally rectangular front opening 3 through which the disc chamber opens to the outside of the drive housing 2. The drive housing 2 includes a complementally shaped front door 4 for selectively opening and closing the front opening 3, but normally biased by a suitable biasing element such as, for example, a spring so as to close the front opening 3, and a main tray 1 adapted to be driven by a drive means between a withdrawn position, in which the main tray 1 is positioned outside the drive housing 2 as shown in FIG. 1A, and an inserted position in which the main tray 1 is positioned inside the drive housing 2 as shown in FIGS. 1B to 1D.

When the main tray 1 is in the withdrawn position, a plurality of, for example, five, subtrays $6_1$ to $6_5$ each carrying an information bearing optical disc 5, as best shown in FIG. 2, can be stacked on the main tray 1. When information on any one of the optical discs 5 is desired to be read out or reproduced, the stack of the subtrays $6_1$ to $6_5$ on the main tray 1 must be held at a stand-by position as shown in FIGS. 1B to 1D with the main tray 1 moved to the inserted position. The number of the subtrays that can be stacked on the main tray 1 may be of any desired value unless it exceeds the maximum available capacity of the main tray 1 which is, in the illustrated embodiment, chosen to be five for illustrative purpose, each subtray having the respective optical disc 5 placed thereon.

Where information on any one of the optical discs 5 is desired to be reproduced, this is possible only when the main tray 1 carrying the subtrays $6_1$ to $6_5$ is moved to the inserted position with the stack of the subtrays $6_1$ to $6_5$ brought to the stand-by position and one of the subtrays carrying such one of the optical discs 5, for example, the subtray $6_5$, must be subsequently drawn to a loaded position as shown in FIG. 1C. When the subtray $6_5$ is so drawn to the loaded position, the optical disc 5 on such subtray $6_5$ is clamped between a clamper (not shown) and a turntable so that such optical disc can be driven in one direction about a spindle in any known manner. As will become clear from the subsequent description, the turntable referred to above is supported on a traverse plate or clamp support plate 79 (FIGS. 15 and 16) having one end connected with clamp support pins 78a and 78b (FIGS. 15 to 18) so that the traverse plate 79 can be angularly moved up and down about the clamp support pins 78a and 78b.

Figure 3:
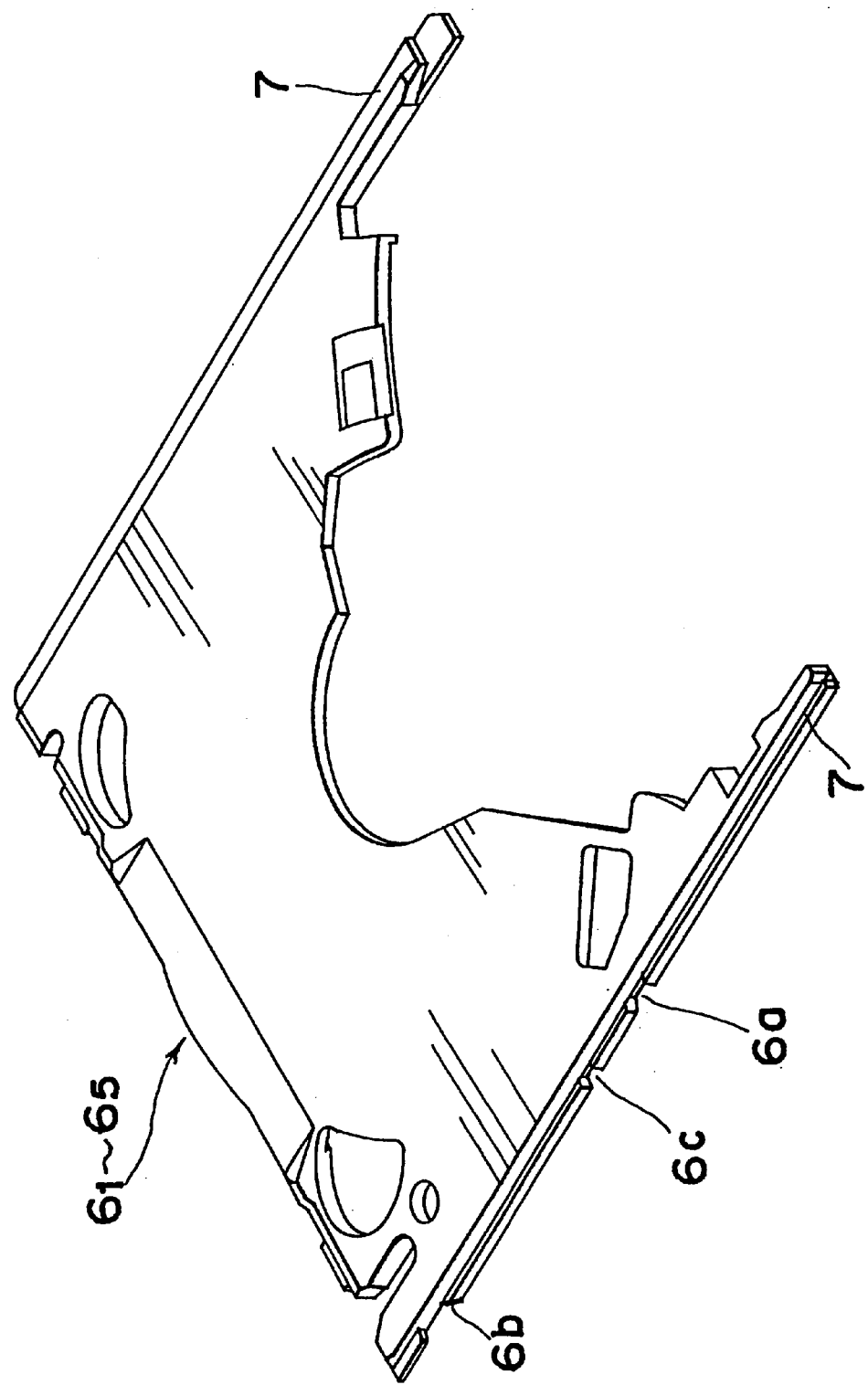
FIG. 3 is a schematic perspective view of one of the subtrays employed in the present invention, as viewed from bottom.

As best shown in FIG. 3, each of the subtrays $6_1$ to $6_5$ has its opposite side edges formed with a substantially L-sectioned support step 7 and extending from a portion adjacent the front edge thereof towards another portion adjacent the rear edge thereof so that, when the plural subtrays $6_1$ to $6_5$ are stacked on the main tray 1, the support steps 7 on each side of the stack of the subtrays $6_1$ to $6_5$ can define a generally U-shaped guide groove 8 between the neighboring members of the stacked subtrays $6_1$ to $6_5$ as best shown in FIG. 19. Each of the guide grooves 8 opens laterally outwardly of the stack of the subtrays $6_1$ to $6_5$. It is to be noted that although the guide grooves 8 referred to above are formed on both sides of the-stacked subtray assembly, no guide groove is needed between only a right-hand side edge of the lowermost one of the stacked subtrays, that is, the subtray $6_1$, and a subtray receiving surface or bottom surface 9 of the main tray 9.

Figure 4:
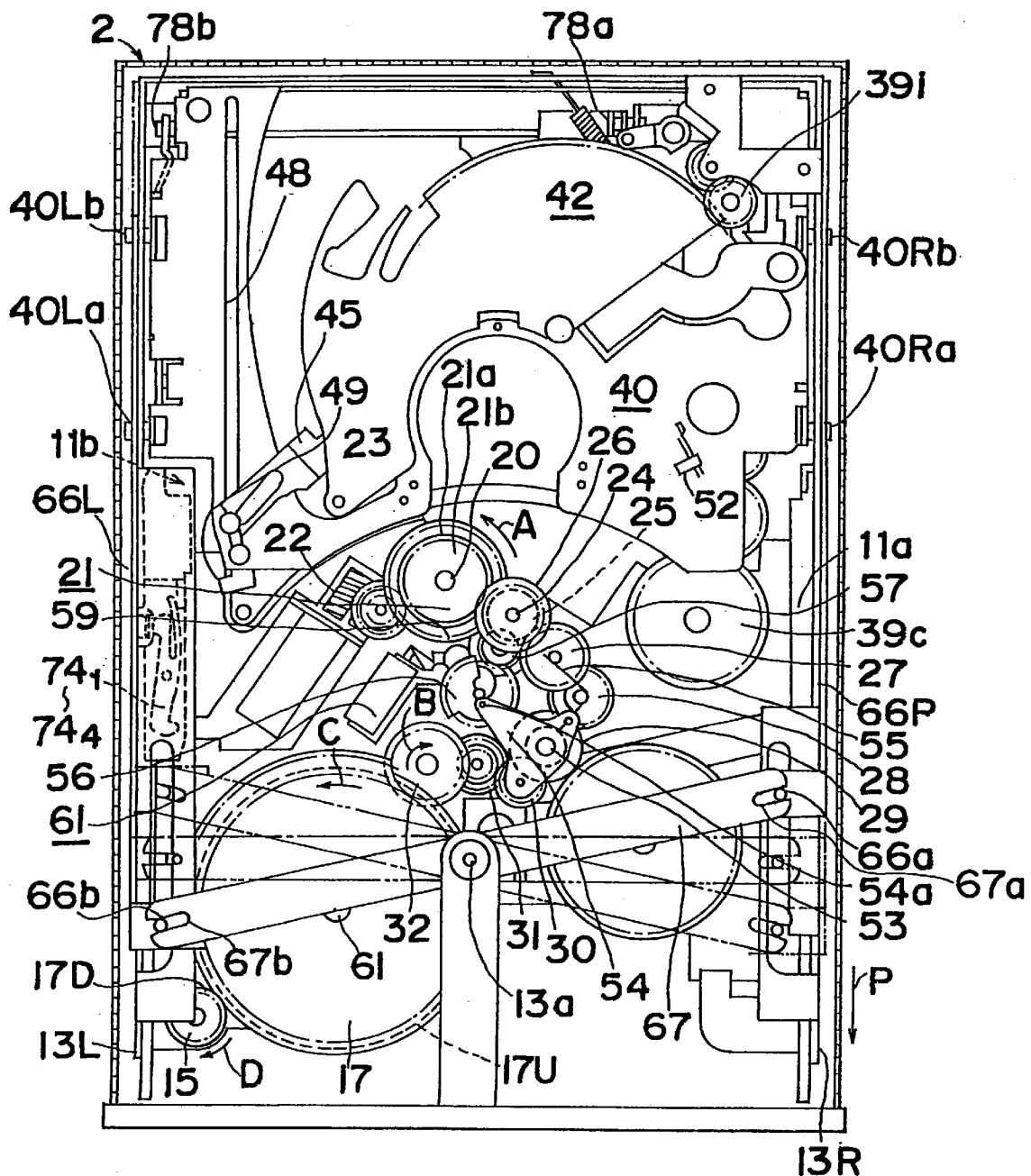
FIG. 4 is a plan view of the optical disc drive apparatus embodying the present invention, with the main tray removed.
Figure 15:
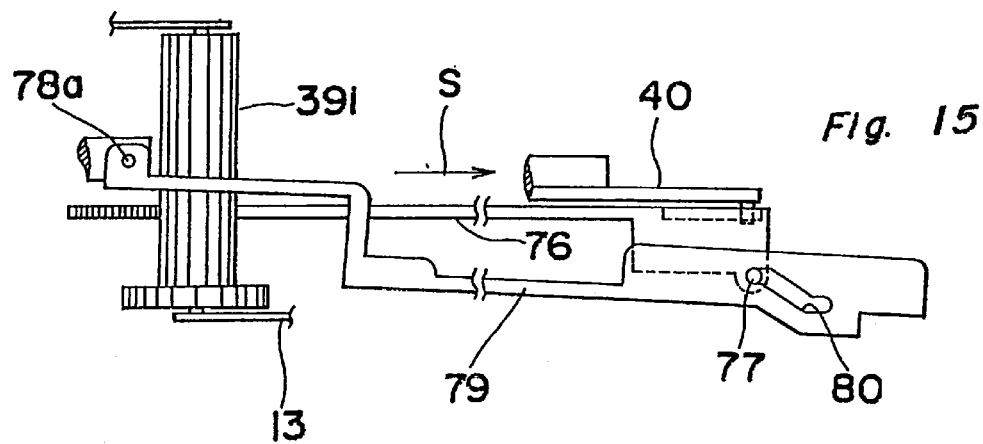
FIGS. 15 and 16 are fragmentary side views, showing a drive system for a disc clamp device in different operative positions, respectively.

Referring to FIGS. 4, 15 and 19, the drive housing 2 includes a chassis 13 installed inside the drive housing 2 and including right and left side walls 13L and 13R having respective fixed guide blocks 11a and 11b secured thereto so as to confront the disc chamber. Each fixed guide block 11a or 11b has a plurality of parallel ribs 10 formed therein which can be engaged slidingly in the respective guide grooves 8 in the stacked subtray assembly when the main tray 1 carrying the stacked subtrays $6_1$ to $6_5$ is moved to the inserted position with the stacked subtrays $6_1$ to $6_5$ consequently held at the stand-by position.

Replacement of the optical disc 5 on any one of the subtrays $6_1$ to $6_5$ with a different optical disc while as shown in FIG. 1B the main tray 1 carrying the stacked subtrays $6_1$ to $6_5$ is held at the inserted position, or while one of the subtrays $6_1$ to $6_5$ on the main tray 1 then held at the inserted position is drawn from the stand-by position towards the loaded position as shown in FIG. 1C, can be carried out in the following manner.

Assuming that one of the stacked subtrays $6_1$ to $6_5$ is held at the loaded position, such one of the stacked subtrays $6_1$ to $6_5$ has to be returned to the stand-by position before replacement of the optical disc on such one of the subtrays is carried out. By way of example, assuming that the uppermost one of the subtrays, that is, the subtray $6_5$, is held at the loaded position as shown in FIG. 1C, replacement of the optical disc 5 on the uppermost subtray $6_5$ is carried out after the uppermost subtray $6_5$ is returned to the stand-by position and the main tray 1 carrying the stacked subtrays $6_1$ to $6_5$ is subsequently moved back to the withdrawn position as shown in FIG. 1E. Once the main tray 1 is moved back to the withdrawn position as shown in FIG. 1E, the optical disc 5 resting on the uppermost subtray $6_5$ is readily exposed to the outside and, therefore, the optical disc 5 on the uppermost subtray $6_5$ can readily be replaced with a different optical disc.

On the other hand, where the optical disc 5 on one of the subtrays intervening between the uppermost and lowermost subtrays $6_5$ and $6_1$ is desired to be replaced, for example, where the optical disc 5 on the fourth subtray $6_4$ immediately below the uppermost subtray $6_5$ is desired to be replaced, the main tray 1 carrying the subtrays $6_4$, $6_3$, $6_2$ and $6_1$ is moved back to the withdrawn position leaving only the uppermost subtray $6_5$ at the stand-by position as shown in FIG. 1F, so that when the main tray 1 is brought to the withdrawn position the optical disc 5 resting on the fourth subtray $6_4$ can be exposed to the outside and can, therefore, be readily replaced.

The uppermost subtray $6_5$ left at the stand-by position as shown in FIG. 1F during the replacement of the optical disc on the fourth subtray $6_4$ as discussed above, is held there and retained substantially horizontally with its rear ends supported by the associated ribs 10 (FIG. 19) of the fixed guide blocks 11a and 11b (FIG. 19) and with its front edge resting on respective rear ends of the subtrays $6_1$ to $6_4$ remaining on the main tray 1 then moved to the withdrawn position.

Replacement of the optical disc 5 on any one of the subtrays $6_3$, $6_2$ and $6_1$ can be carried out in a manner similar to that described above. Briefly speaking, replacement of the optical disc 5 on the subtray $6_3$, $6_2$ or $6_1$ is carried out by leaving the uppermost and fourth subtrays $6_5$ and $6_4$, the uppermost, fourth and third subtrays $6_5$, $6_4$ and $6_3$, or the uppermost, fourth, third and second subtrays $6_5$, $6_4$, $6_3$ and $6_2$, at the stand-by positions and then moving the main tray 1 carrying the subtrays $6_3$, $6_2$ and $6_1$, the subtrays $6_2$ and $6_1$, or only the lowermost subtray $6_1$, back to the withdrawn position, respectively, as shown in FIGS. 1G, 1H or 1I.

As described above, while the optical disc drive apparatus of the present invention is-so designed as to allow the plural subtrays to be mounted on the main tray in a stacked fashion and as to allow the plural subtrays to be accommodated within the disc chamber together with the main tray then moved to the inserted position, one of the subtrays which carries the optical disc to be replaced can be exposed to the outside when the main tray is moved back to the withdrawn position. Thus, the optical disc drive apparatus of the present invention has an excellent operativity. In addition, the optical disc drive apparatus of the present invention can accommodate an increased number of the subtrays since the plural subtrays can be stacked on the main tray 1 in a reasonable fashion, making it possible to accomplish a maximized utilization of the limited space.

Hereinafter, the various components of the optical disc drive apparatus of the present invention effective to accomplish the foregoing principle of disc replacement will be described in detail.

[Drive System for Main Tray 1]

Figure 5:
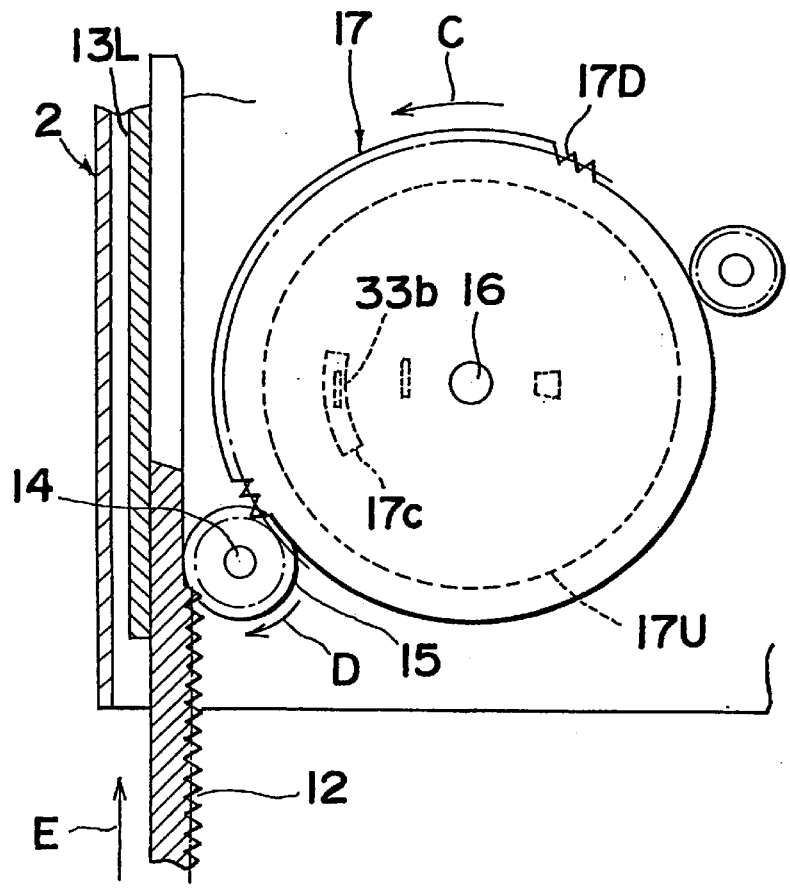
FIG. 5 is a schematic plan view, on an enlarged scale, showing a main tray drive mechanism employed in the optical disc drive apparatus, with a main gear assembly held at one operative position.
Figure 6:
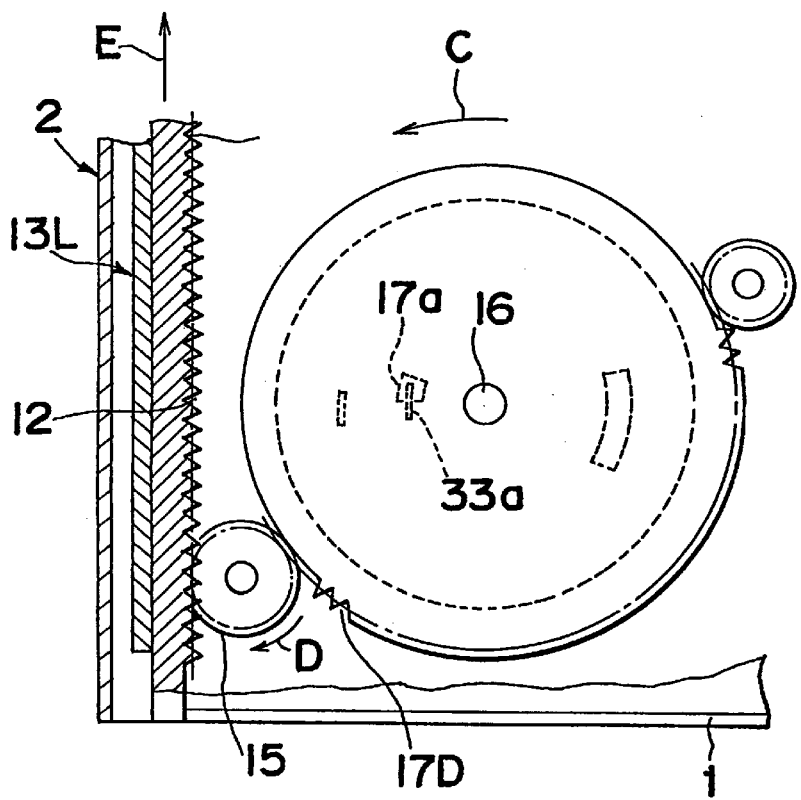
FIG. 6 is a view similar to FIG. 5, showing the main gear assembly held at a different operative position.

As best shown in FIG. 2, a rack 12 is formed on an undersurface of the main tray 1 so as to extend along at least one side edge, for example, a left side edge, thereof in a direction lengthwise of the main tray 1, i.e., in a direction conforming to the direction of movement thereof between the withdrawn and inserted positions. In the condition in which the main tray 1 is set in the drive housing 2, the rack 12 is, as best shown in FIGS. 5 and 6, drivingly engaged with a pinion gear 15 that is rotatably mounted on a pin 14 secured to the chassis 13 of the drive housing 2 and that is drivingly coupled with a main gear assembly 17.

The main gear assembly 17 is rotatable about a pin 16 secured to the chassis 13 and is comprised of an upper and a lower gear wheel formed coaxially therewith. The upper gear wheel has a toothless portion and a toothed portion 17D whereas the lower gear wheel is in the form of a spur gear 17U. The pinion gear 15 meshed with the rack 12 is engageable with the toothed portion 17D of the upper gear wheel of the main gear assembly 17 so that when the pinion gear 15 is drivingly engaged with the toothed portion 17D a driving force of a drive motor 19 can be transmitted to the pinion gear 15 and in turn to the rack 12 through a gear 32 that is, as shown in FIG. 4, meshed with the lower gear wheel of the main gear assembly 17, that is, the spur gear 17U.

The chassis 13 has a pin 20 secured thereto, on which a friction gear assembly 21 is rotatably mounted. This friction gear assembly 21 may be of a design utilizing any known friction mechanism and includes input and output gears 21a and 21b rotatably mounted on the pin 20 in coaxial relation with each other, a friction element such as, for example, a piece of felt (not shown) interposed between the input and output gears 21a and 21b, and a biasing element (also not shown) such as, for example, a coil spring, for urging one of the input and output gears 21a and 21b towards the other of the input and output gears 21a and 21b.

Figure 12:
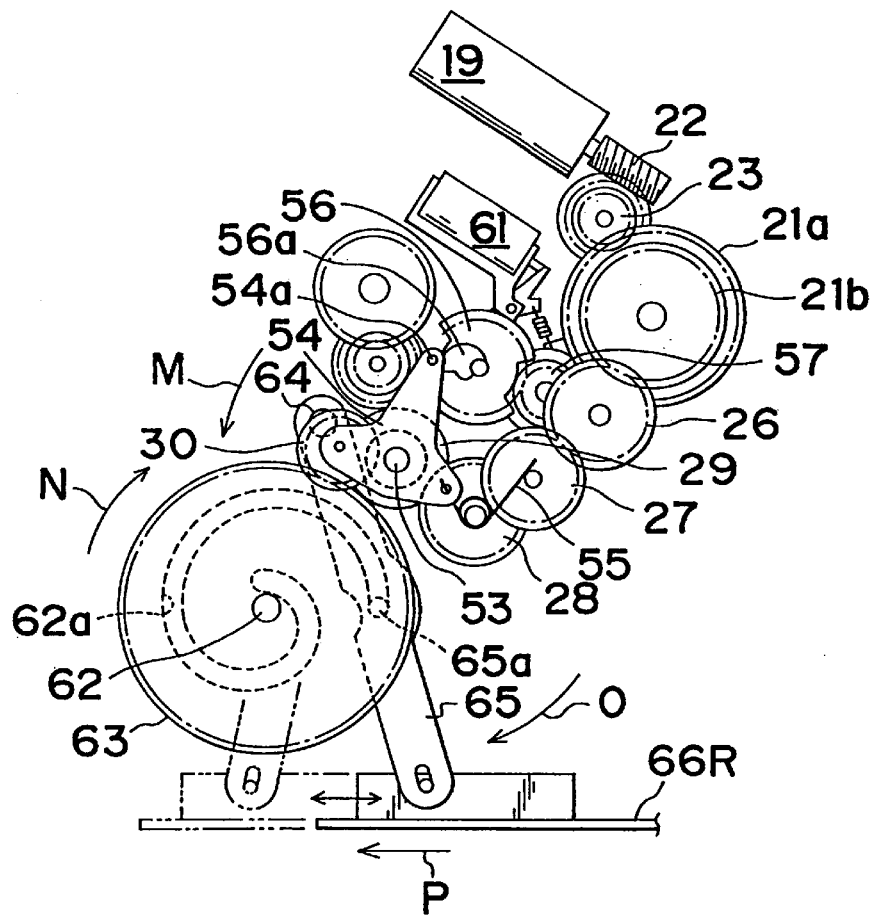
FIG. 12 is a fragmentary plan view of the optical disc drive apparatus, showing an elevating mechanism for selectively lifting and lowering the loading drive mechanism.
Figure 13:
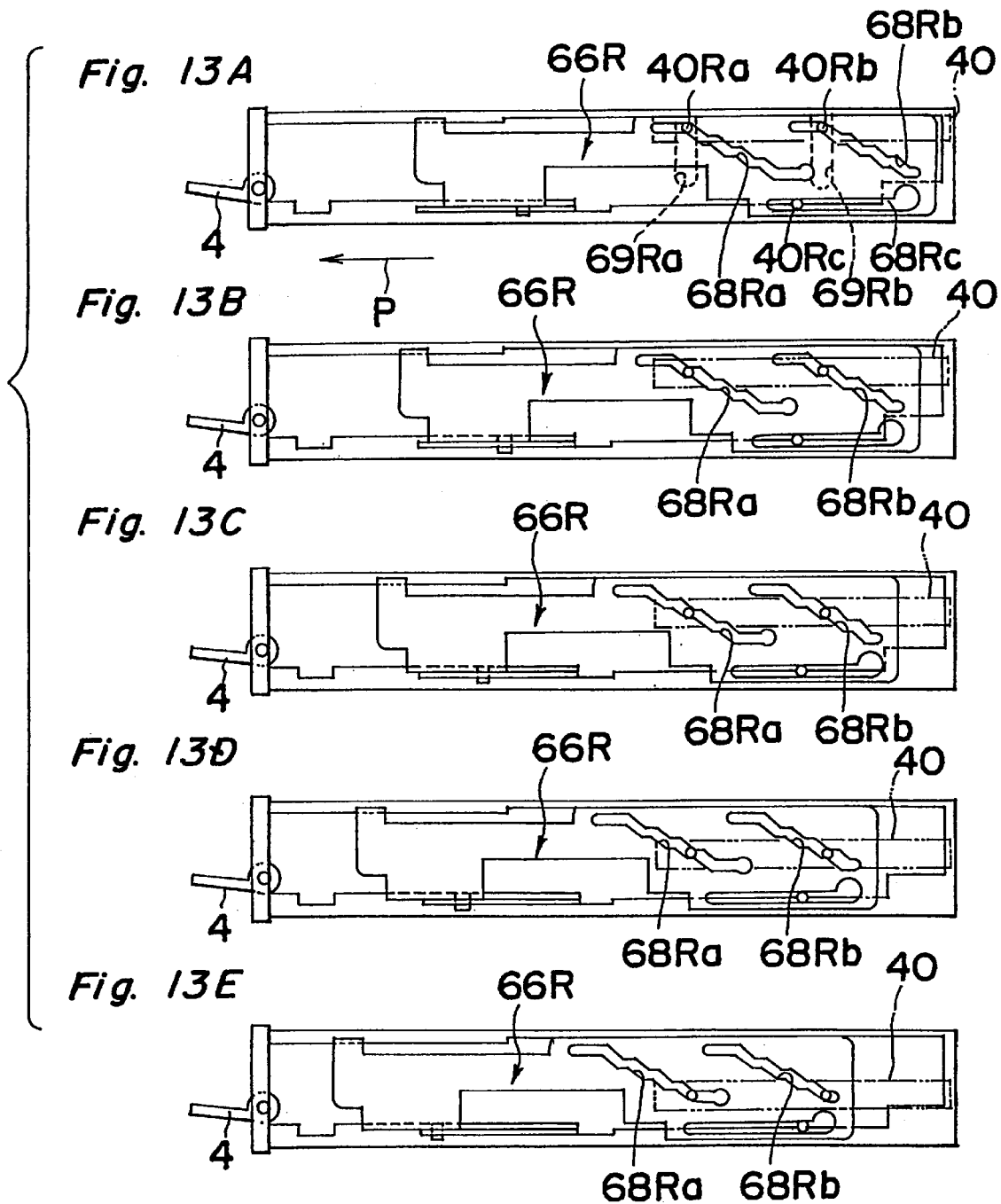
FIGS. 13A to 13E are schematic side views of the optical disc drive apparatus, showing a right guide plate slidable along a right side wall of the drive housing to assume one of different positions corresponding respectively to the positions of the stacked subtrays on the main tray.

As shown in FIG. 12, a worm 22 mounted on a drive shaft of the drive motor 19 is meshed with the input gear 21a of the friction gear assembly 21 through an intermediate gear 23. Lower and upper gears 25 and 26 are coaxially rotatably mounted on a pin 24 secured to the chassis 13 and are respectively meshed with the input and output gars 21a and 21b of the friction gear assembly 21. Unless slip takes place between the input and output gears 21a and 21b of the friction gear assembly 21, the lower and upper gears 25 and 26 rotate together with each other about the pin 24.

Accordingly, when the drive motor 19 is driven in a first direction, the friction gear assembly 21 is rotated in a direction shown by the arrow A and the gear 32 is thus driven in a direction shown by the arrow B through gears 26, 27, 28 and 29, then through an idler gear 30 and finally through a gear 31. Since the gear 32 is meshed with the spur gear 17U of the main gear assembly 17 as hereinbefore described, the main gear assembly 17 is rotated in a direction shown by the arrow C and subsequently causes the toothed portion 17D of the upper gear wheel thereof to engage with the pinion gar 15, the pinion gear 15 being consequently rotated in a direction shown by the arrow D. Upon rotation of the pinion gear 15 in the direction of the arrow D, the main tray 1 is driven towards the inserted position in a direction shown by the arrow E shown in FIGS. 5 and 6.

A control unit (not shown) is so designed that upon arrival of the main tray 1 at the inserted position as shown in FIG. 6, a microswitch 33a fitted to the chassis 13 as shown in FIG. 6 can be activated by a feeler 17a formed integrally with an undersurface of the main gear assembly 17 to deenergize the drive motor 19 with the main tray 1 consequently held at the inserted position. During this movement of the main tray 1 from the withdrawn position towards the inserted position, an elevating unit of a loading drive system as will be described later is held at an uppermost one of plural operative positions at which the uppermost subtray $6_5$ can be loaded as will be described later.

Figure 7:
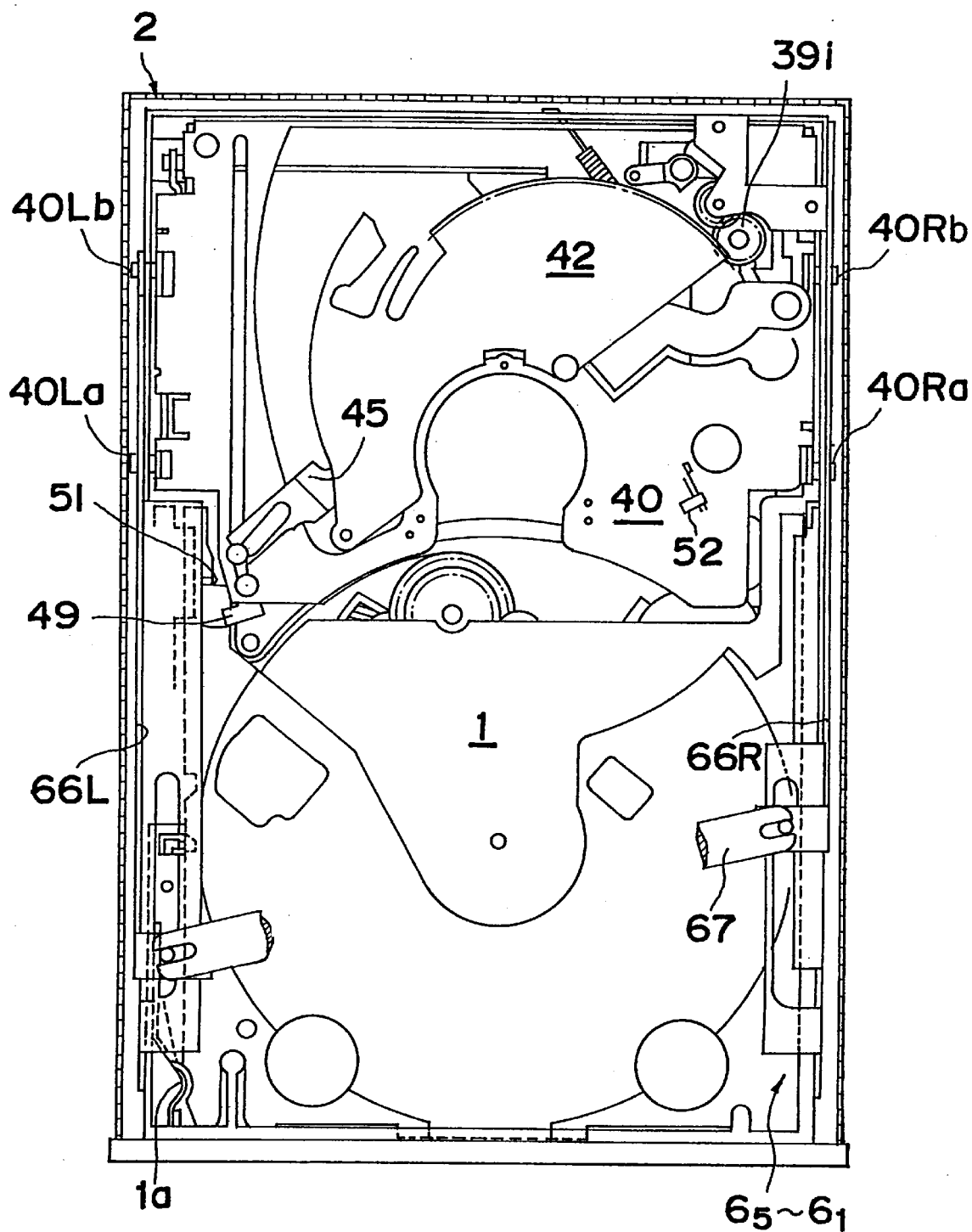
FIG. 7 is a plan view of the optical disc drive apparatus with the main tray held at the inserted position inside the drive housing.
Figure 8:
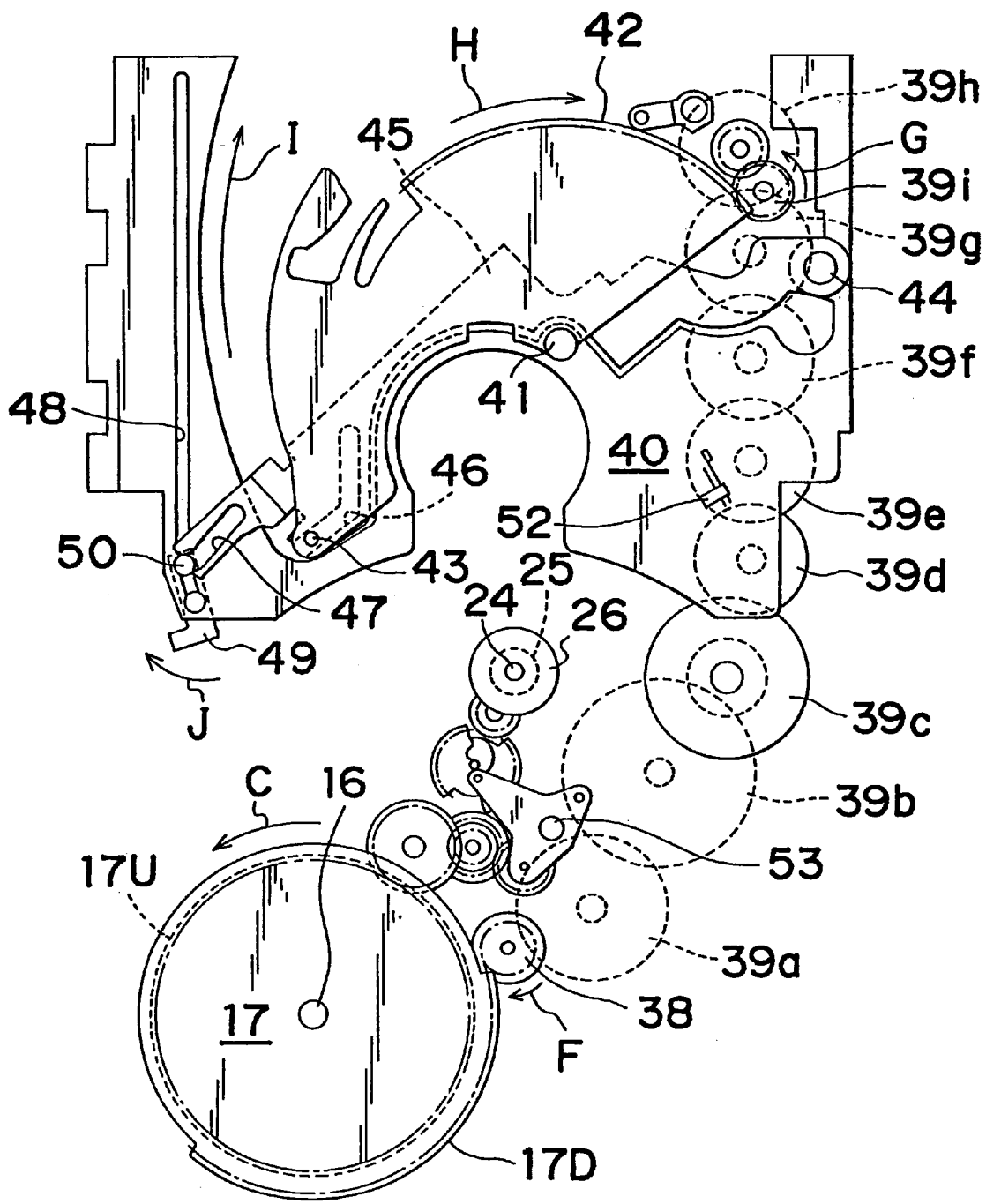
FIG. 8 is a fragmentary plan view showing a drive gear system employed in the optical disc drive apparatus with a sector gear held at one operative position.
Figure 9:
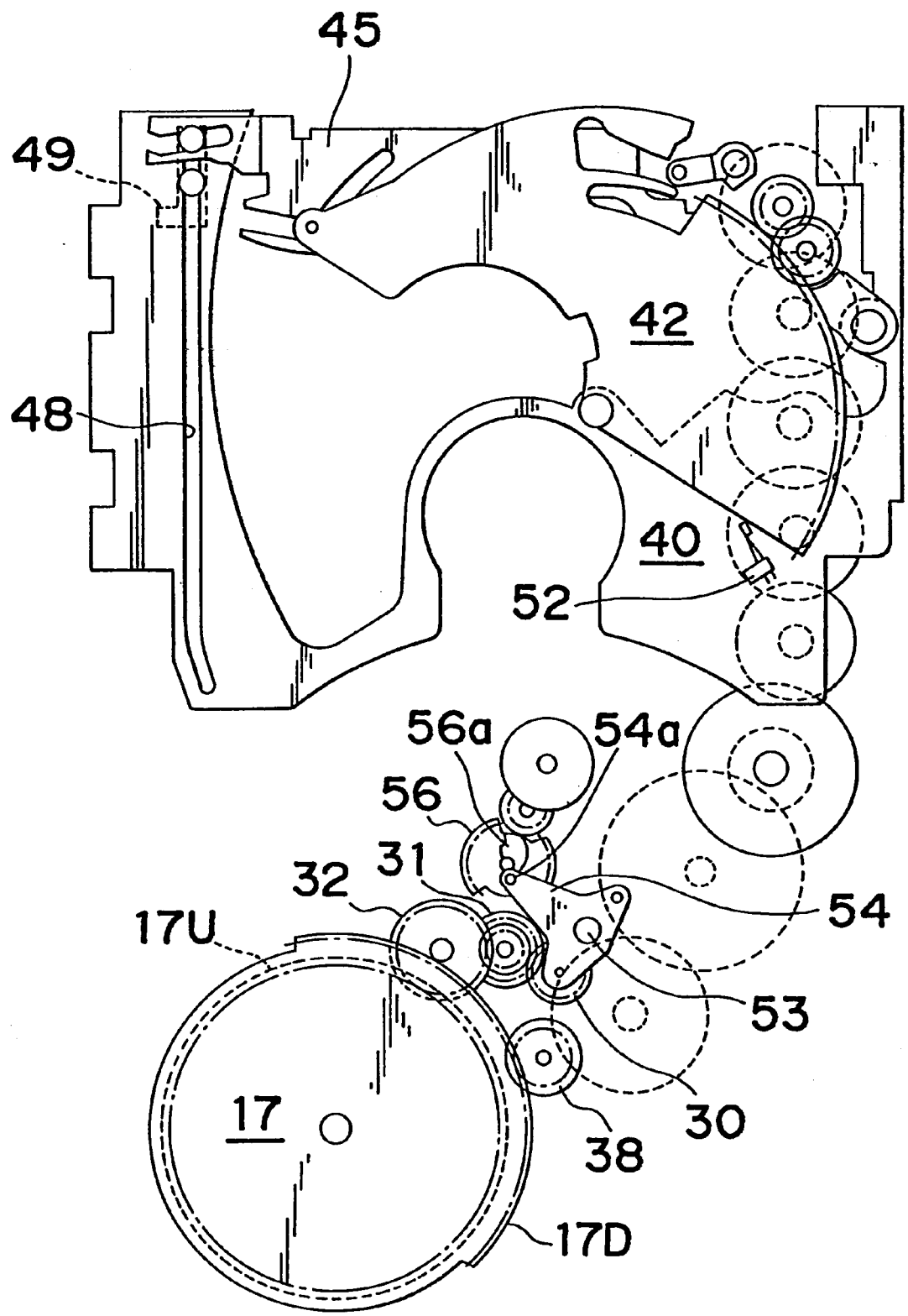
FIG. 9 is a view similar to FIG. 8, showing the sector gear held at a different operative position.

[Drive System for Loading Subtrays]

Where the optical disc 5 placed on the uppermost subtray $6_5$ with the main tray 1 held at the inserted position is to be loaded with the uppermost subtray $6_5$ drawn from the stand-by position to a loaded position, the pinion gear 15 is disengaged from the toothed portion 17D of the upper gear wheel of the main gear assembly 17 and is instead aligned with the toothless portion of the upper gear wheel as shown in FIG. 6 upon arrival of the main tray 1 at the inserted position as shown in FIG. 7. When during this condition a command is given to the control unit to move the uppermost subtray $6_5$ to the loaded position, the drive motor 19 is driven in the first direction to rotate the gear 32 in the direction of the arrow B through the gear train. Consequently, the main gear assembly 17 is rotated in the direction of the arrow C with the spur gear 17D of the main gear assembly 17 consequently meshed with a gear 38 as shown in FIGS. 8 and 9 to drive the latter in a direction shown by the arrow F. Rotation of the gear 38 is then transmitted to a gear 39c through first and second intermediate gears 39a and 39b, rotatably secured to the undersurface of the chassis 13, and then to a gear 39i through a gear train including gears 39d, 39e, 39f, 39g and 39h all rotatably mounted on an upper surface of the chassis 13, to drive the gear 39i in a direction shown by the arrow G.

The gear 39i is meshed with a sector gear 42 pivotally mounted through a pin 41 on an elevating table 40 of a loading drive system and, therefore, when the gear 39i is driven in the direction of the arrow G in the manner described above, the sector gear 42 pivots from a first position towards a second position in a direction shown by the arrow H. The sector gear 42 carried a pin 43 fixedly mounted on one end of the sector gear 42, which pin 43 is relatively movably engaged in a cut groove 46 defined in a motion translating lever 45 journalled at one end thereof to the elevating table 40 through a pin 44 as shown in FIG. 8. Accordingly, as the sector gear 42 is pivoted in a direction shown by the arrow H about the pin 41, the motion translating lever 45 is pivoted about the pin 44 from a position shown in FIG. 8 towards a position shown in FIG. 9 in a direction shown by the arrow I.

Another cut groove 47, defined in one end of the motion translating lever 45 remote from the pin 44 and adjacent the cut groove 46, receives therein a pin 50 fixed on a loading hook member 49 that is slidable engaged in a longitudinal guide slot 48 defined in the elevating table 40 so as to extend in a direction parallel to the direction of insertion of the main tray 1. Accordingly, as the motion translating lever 45 is pivoted about the pin 44 in the direction of the arrow I, the loading hook member 49 is guided along a bent region of the longitudinal guide slot 48, that is defined at a front end thereof, and is, upon escape of the loading hook member 49 from the bent region of the guide slot 48, pivoted about the pin 50 in a direction shown by the arrow J so as to enter a straight region of the guide slot 48 before the loading hook member 40 attains a position shown in FIG. 9.

As the loading hook member 49 is moved from a position shown in FIGS. 7 and 8 towards the position shown in FIG. 9, the loading hook member 49 is engaged with an engagement 51 formed integrally with and defined at a left rear end of the subtray $6_5$ and then draw only the subtray $6_5$ from the stand-by position towards the loaded position. When the sector gear 42 is pivoted to the second position as shown in FIG. 9 with the subtray drawn from the stand-by position within the main tray 1 to the loaded position, the opposite end of the sector gear 42 remote from the end thereof where the pin 43 is fixedly mounted is brought into abutment with a leaf switch 52 secured to the elevating table 40 of the loading drive system. The control unit detects abutment of that end of the sector gear 42 against the leaf switch 52 to halt the drive motor 19 having then driven in the first direction.

The gear 39i that drives the sector gear 42 in the manner described above is engaged with a clamp drive rack 76 as shown in FIG. 15 and that a guide pin 77 secured to one end of the clamp drive rack 76 remote from the gear 39i is slidingly engaged in a cam groove 80 defined in a rear end of the traverse plate 79 having the opposite front end rockingly supported by the elevating table 40 by means of the clamp support pins 78a and 78b as shown in FIG. 4. It is to be noted that the clamp drive rack 76 forms a part of a clamp means for moving the traverse plate 79 up and down in a manner as will be described later.

Figure 16:
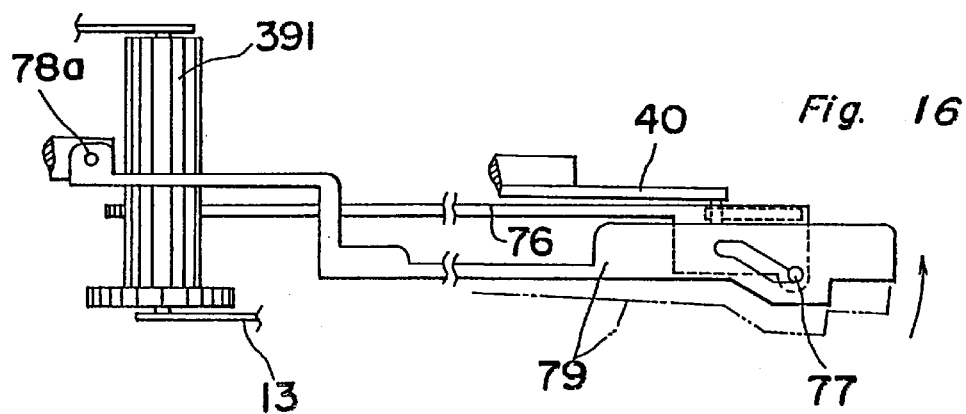

Thus, when the clamp drive rack 76 is slid in a direction shown by the arrow S along the elevating table 40 as a result of rotation of the gear 39i, the traverse plate 79 is pivoted from a position, shown by the phantom line in FIG. 16, about a common axis connecting between the clamp support pins 78a and 78b with the guide pin 77 guided along the cam groove 80 so as to approach the elevating table 40 as shown by the solid line in FIG. 16, with the result that the optical disc 5 on the subtray $6_5$ then drawn to the loaded position is lifted and clamped by the turntable (not shown) carried by the traverse plate 79 so that such optical disc 5 can eventually be driven in one direction.

Figure 10:
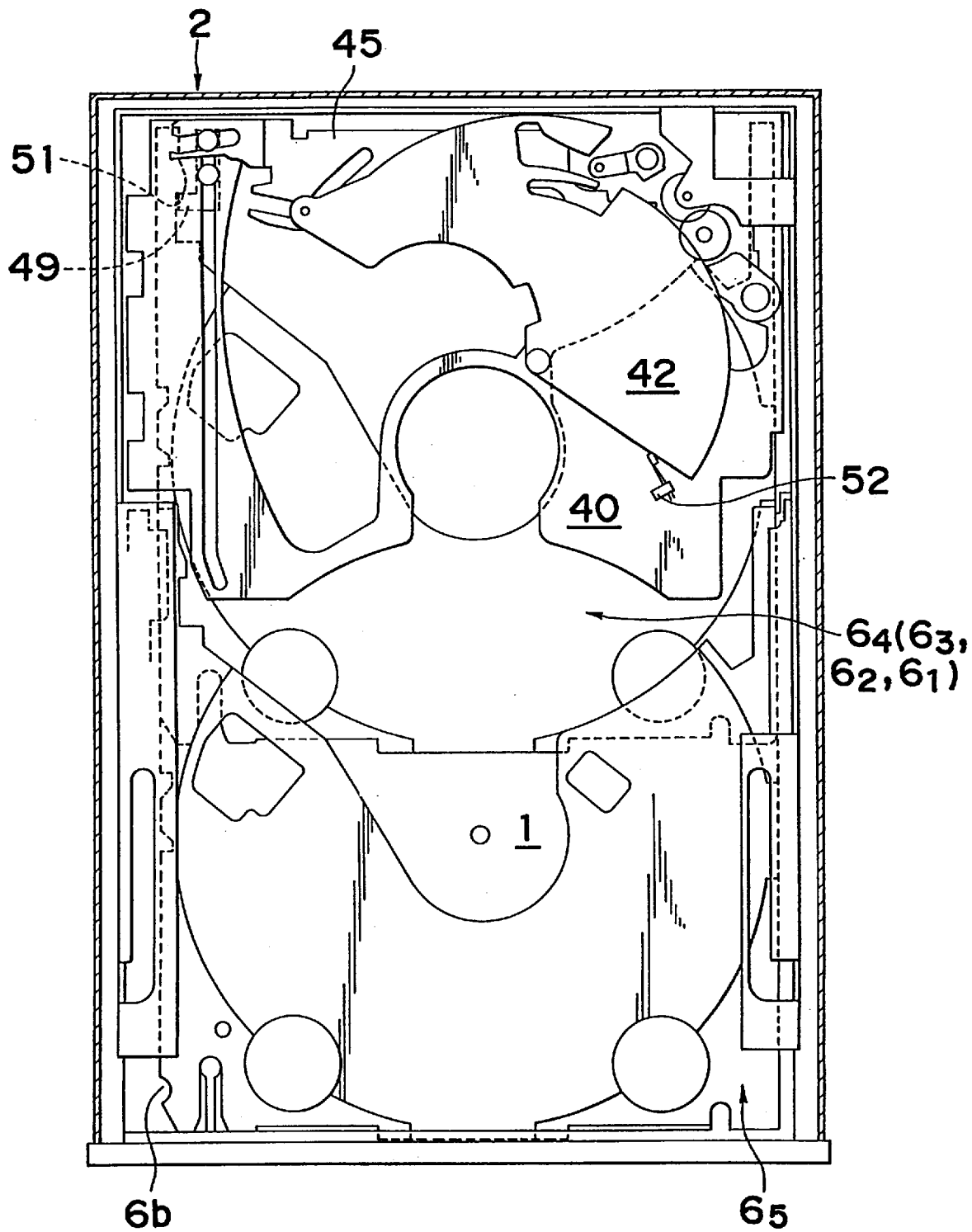
FIG. 10 is a plan view of the optical disc drive apparatus, showing one of the stacked subtrays on the main tray having been drawn to a loaded position.

In any event, where any one of the other subtrays $6_4$, $6_3$, $6_2$ and $6_1$ having the respective optical discs resting thereon is desired to be drawn to the loaded position, the elevating table 40 should be lowered to a level aligned with the optical disc accommodated in such one of the other subtrays and, thereafter, the optical disc accommodated in such one of the other subtrays has to be loaded as shown in FIG. 10 in a manner similar to that discussed in connection with the uppermost subtray $6_5$.

[Elevating System of Loading Drive System]

A drive system for selectively elevating and lowering the elevating table 40 while the main tray 1 is held at the inserted position is so structured and so designed as follows.

As shown in FIGS. 4 and 8, the idler gear 30 is mounted on a generally T-shaped pivot lever 54 pivotable about a pin 53 secured to the chassis 13 and is generally biased by a spring 55 so as to engage with the gear 31. This pin 53 also has the gear 29 rotatably mounted thereon and positioned below the T-shaped pivot lever 54. The position of the T-shaped pivot lever 54 is controlled by the shape of a cam member 56a integrally formed on an upper surface of an intermittent gear 56 as will be described later, since a pin 54a secured to the T-shaped pivot lever 54 is slidingly engaged with the cam member 56a. The intermittent gear 56 is of a structure wherein first and second toothless recesses 56a and 56b are formed spaced at an angle of 180° from each other about the axis of rotation of the intermittent gear 56 as clearly shown in FIG. 11. It is to be noted that unless the loading drive system is in a mode of elevating or lowering the elevating table, the intermittent gear 56 is held in a position with the first toothless recess 56a aligned with a gear 57 and, therefore, the intermittent gear 56 will not be rotated.

Figure 11:
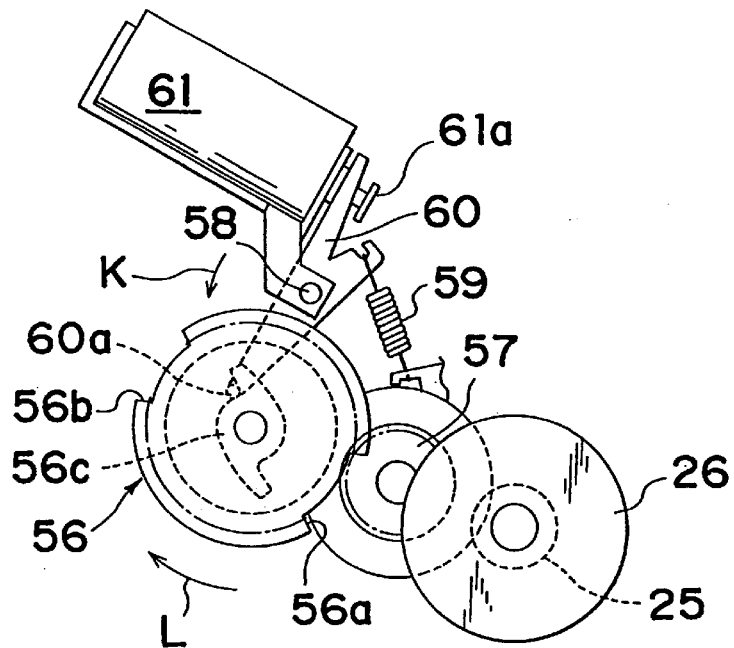
FIG. 11 is a fragmentary plan view of the optical disc drive apparatus, showing a drive motor and its associated drive switching system for selectively transmitting a drive of the motor to one of the main tray drive mechanism and a loading drive mechanism.

The intermittent gear 56 has an undersurface formed with a trigger cam member 56c of a shape as best shown in FIG. 11. Cooperable with this trigger cam member 56c is a trigger lever 60 pivotally supported at a generally intermediate portion thereof by a pin 58 secured to the chassis 13. The trigger lever 60 has one end formed with a projection 60a and the opposite end engaged with a movable piece 61a of a solenoid unit 61 and is normally biased by a tension spring 59 in one direction about the pin 58 with the projection 60a tending to separate away from the trigger cam member 60c.

In order to lower the elevating table 40 of the loading drive system, the solenoid unit 61 has to be temporarily energized to draw the movable piece 61a inwardly to cause the trigger lever 60 to pivot in a direction, shown by the arrow K in FIG. 11, about the pin 58 against the tension spring 59. As the trigger lever 50 is so pivoted against the tension spring 59, the projection 60a integral with the trigger lever 60 pushes the cam member 56c to rotate the intermittent gear 56a slight angle in a direction shown by the arrow L until the intermittent gear 56 is brought into engagement with the gear 57. At the same time, the drive motor 19 has to be driven in the first direction.

When the drive motor 19 is thus driven in the first direction subsequent to engagement between the intermittent gear 56 and the gear 57, the intermittent gear 56 is driven in the direction shown by the arrow L and the trigger cam member 56a does therefore drive the T-shaped lever 54 in a direction shown by the arrow M about the pin 53 with the idler gear 30 consequently brought into engagement with a large-diameter gear wheel 63 to drive the latter as shown in FIG. 12. This large-diameter gear wheel 63 is rotatably supported by a pin 62 secured to the chassis 13. Once the large-diameter gear wheel 63 is so driven about the pin 62, rotation of the large-diameter gear wheel 63 continues before the intermittent gear 56 is rotated to a position where the second toothless recess 56b is aligned with the gear 57 to thereby disengage the intermittent gear 56 from the gear 57. In other words, the large-diameter gear wheel 63 is halted at the moment the second toothless recess 56b in the intermittent gear 56 then being rotated is brought into alignment with the gear 57.

When the drive motor 19 is subsequently driven in a second direction counter to the first direction to drive the friction gear assembly 21 in a direction counter to the direction of the arrow A, the large-diameter gear wheel 63 is rotated in a direction shown by the arrow N through the gear trains including the gears 26 to 29 and the idler gear 30.

Referring particularly to FIG. 12, the large-diameter gear wheel 63 has an undersurface formed with a generally helical cam groove 62a defined therein and slidably accommodating therein a guide pin 65a rigidly secured to a generally intermediate portion of a drive lever 65. This drive lever 65 has one end rotatably mounted on a pin 64 secured to the chassis 13 and the other end pivotally coupled with a lower end of a right guide plate 66R slidably supported by and positioned exteriorly of the right side wall 13R of the chassis 13 for sliding movement therealong. Accordingly, as the large-diameter gear wheel 63 is rotated in the direction of the arrow N, the drive lever 65 is pivoted about the pin 64 in a direction shown by the arrow O with the guide pin 65a slidingly guided along the helical cam groove 62a and that end of the drive lever 65 remote from the pin 64 consequently causes the right guide plate 66R to move along the right side wall 13R in a direction shown by the arrow P, that is, in a direction towards the front opening 3 of the drive housing 2.

As best shown in FIG. 4, the right guide plate 66R and a similar left guide plate 66L slidably supported by and positioned exteriorly of the left side wall 13L of the chassis 13 for sliding movement along the left side wall 13L have respective upper portions to which pins 66a and 66b are secured. Those pins 66a and 66b are loosely engaged in associated cutouts 67a and 67b defined in opposite ends of a connecting lever 67 that has an intermediate portion pivotally mounted on a pin 13a depending from a ceiling plate of the chassis 13. Accordingly, movement of the right guide plate 66R towards the front opening 3, that is, in the direction of the arrow P is accompanied by movement of the left guide plate 66L in a direction counter to the direction of the arrow P. That is, the left and right guide plates 66L and 66R are supported for movement along the left and right side walls 13L and 13R in respective directions counter to each other depending on the direction of pivot of the connecting lever 67.

As best shown in FIG. 13A, the right guide plate 66R is formed with a pair of inclined guide grooves 68Ra and 68Rb, both extending generally parallel to each other at an angle relative to the longitudinal axis of the right guide plate 66R, and a straight guide groove 68Rc extending parallel to the longitudinal axis of the right guide plate 66R. Similarly, the left guide plate 66L is formed with a pair of inclined guide grooves 68La and 68Lb, both extending generally parallel to each other at an angle relative to the longitudinal axis of the left guide plate 66L, and a straight guide groove 68Lc extending parallel to the longitudinal axis of the right guide plate 66L. All of the inclined guide grooves 68Ra, 68Rb, 68La and 68Lb are of an identical configuration, but the inclined guide grooves 68Ra and 68Rb in the right guide plate 66R are inclined in an opposite sense relative to the inclined guide grooves 68La and 68Lb in the left guide plate 66R. This is necessitated because as discussed previously the right and left guide plates 66R and 66L are driven in the respective directions opposite to each other in response to the pivotal movement of the connecting lever 67 to thereby selectively lift or lower the elevating table 40 without allowing the latter to skew or tilt relative to a plane in which the optical disc may lie.

The elevating table 40 of the loading drive system has its opposite side portions to which guide pins 40Ra and 40Rb and similar guide pins 40La and 40Lb are secured, respectively, so as to extend laterally outwardly. The guide pins 40Ra and 40Rb secured to the right side portion of the elevating table 4 extend through respective vertical slots 69Ra and 69Rb, defined in the right guide plate 13L of the chassis 13, and then through the corresponding inclined guide grooves 68Ra and 68Rb also defined in the right guide plate 66R. Similarly, the guide pins 40La and 40Lb secured to the left side portion of the elevating table 40 extend through respective vertical slots 69La and 69Lb, defined in the left guide plate 13L of the chassis 13, and then through the corresponding inclined guide grooves 68La and 68Lb also defined in the left guide plate 66L.

Pins 40Rc and 40Lc secured to the right and left guide plates 66R and 66L, respectively, are engaged in the associated straight guide grooves 68Rc and 68Lc.

The right-side inclined guide grooves 68Ra and 68Rb and the left-side inclined guide grooves 68La and 68Lb are of an identical configuration and are so designed and so shaped that as the left and right guide plates 66L and 66R are moved in unison in response to the pivotal movement of the connecting lever 67, the elevating table 40 can, with the pins 40Lc and 40Rc guided within the associated straight guide grooves 68Lc and 68Rc, be moved in a direction perpendicular to the direction of movement of each guide plate 66L or 66R to assume one of five stop positions associated with the subtrays stacked on the main tray 1; the first stop position at which the loading drive system can be accessible to the uppermost or fifth subtray $6_5$ as shown in FIGS. 13A and 14A, the second stop position at which the loading drive system can be accessible to the fourth subtray $6_4$ as shown in FIGS. 13B and 14B, the third stop position at which the loading drive system can be accessible to the third subtray $6_3$ as shown in FIGS. 13C and 14C, the fourth stop position at which the loading drive system can be accessible to the second subtray $6_2$ as shown in FIGS. 13D and 14D, and the fifth stop position at which the loading drive system can be accessible to the lowermost or first subtray $6_1$ as shown in FIGS. 13E and 14e.

[Drive System For Disc Clamp]

The manner in which the optical disc 5 is clamped and the structure necessary to accomplish it will now be described with particular reference to FIGS. 15 to 18.

As hereinbefore described, in the disc drive apparatus embodying the present invention, rotation of the gear 39i results in drive of the motion translating lever 45 and the loading hook member 49 together with the sector gear 42 to pull one of the subtrays $6_1$ to $6_5$ to the loaded position. At this loaded position, the center of the optical disc on the subtray then held at the loaded position is aligned with a center of the turntable 83 for lifting and rotating the optical disc.

As the gear 39i is further driven the clamp drive rack 76 is slid in the direction shown by the arrow S and the traverse plate 79 is pivoted from a position, shown by the phantom line in FIG. 16, angularly upwardly about a common axis connecting between the clamp support pins 78a and 78b with the guide pin 77 guided along the cam groove 80 so as to approach the elevating table 40 as shown by the solid line in FIG. 16. Consequently, the optical disc 5 on the subtray then drawn to the loaded position is lifted and clamped by the turntable 83 carried by the traverse plate 79 through a spindle drive motor 84 so that such optical disc 5 can eventually be driven in one direction.

It is to be noted that the clamp support pins 78a and 78b are so disposed as to allow the common axis connecting therebetween to incline such that one of the clamp support pins 78a and 78b which is positioned adjacent the clamp drive rack 76, that is, the right-hand clamp support pin 78a, can be positioned at a level lower than the other of the clamp support pins, that is, the clamp support pin 78b. The reason therefor will now be discussed.

Where as hereinbefore discussed the point of pivot of the traverse plate 79 is located at a position spaced from a relatively heavy component part such as the turntable 83 or the spindle drive motor 84, and once the traverse plate 79 is deformed, the traverse plate 79 will be pivoted having been skewed or tilted relative to a plane containing the common axis between the clamp support pins 78*a* and 78*b*. Specifically, considering that the clamp drive rack 76 carrying the guide pin 77 is positioned only adjacent a right side wall, as viewed in FIG. 17, of the traverse plate with the guide pin 77 engaged in the cam groove 80 that is defined in that right side wall of the traverse plate 79 and that the traverse plate 79 supports thereon the relatively heavy components such as the turntable 83 and the spindle drive motor 84 positioned substantially intermediate of the width of the traverse plate 79, it may occur that the traverse plate 79 when angularly lifted by the guide pin 77 about the common axis between the clamp support pins 78*a* and 78*b* from the position shown in FIG. 15 to the solid lined position shown in FIG. 16 may be deformed, i.e., skewed or tilted sidewise.

Accordingly, to compensate for the possible sidewise skew of the traverse plate 79 during the pivot of the latter about the common axis between the clamp support pins 78*a* and 78*b*, the right-hand clamp support pin 78*a* is positioned at a level lower than the clamp support pin 78*b* so that in anticipation of the possible sidewise skew of the traverse plate 79, the left-hand side of the traverse plate 79 can be slightly lifted relative to the right-hand side of the traverse plate 70. By so designing, when the traverse plate 79 is angularly moved to the solid line position shown in FIG. 16 to cause the turntable 83 to clamp the optical disc in cooperation with the clamper (not shown), not only can the traverse plate 79 assume a horizontal position parallel to the elevating table 40, but the optical disc 5 can also be retained horizontally.

The disc drive apparatus of the present invention is also provided with means for restraining the elevating table 40 relative to the chassis 13 to thereby avoid any possible quivering motion of the elevating table 40 which would occur when the optical disc is driven at a high speed to speed up the information reading from the optical disc. The use of the restraining means in combination of the unique design in which the right-hand clamp support pin 78*a* is positioned at a level lower than the clamp support pin 78*b* so that the left-hand side of the traverse plate 79 can be slightly lifted relative to the right-hand side of the traverse plate 70, is effective to facilitate a high speed reading of information from the optical disc without accompanied by generation of obnoxious sounds.

Figure 17:
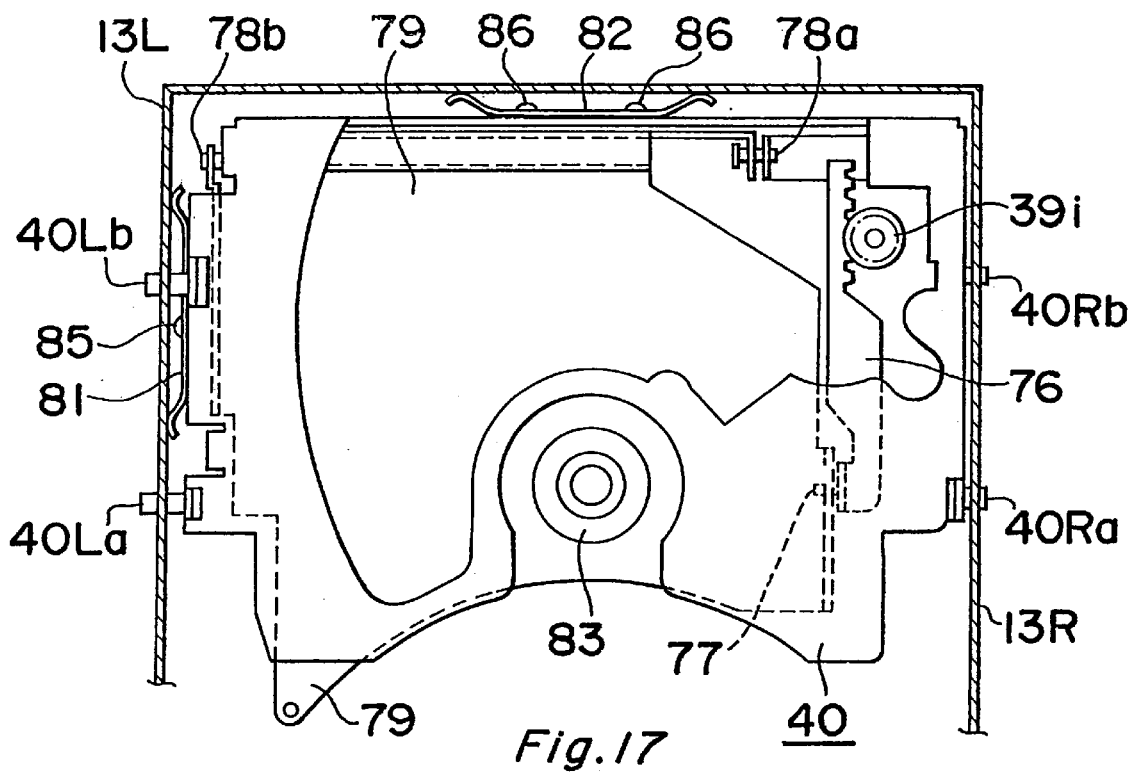
FIG. 17 is a plan view of the optical disc drive apparatus, showing means for restraining an elevating table relative to the chassis which is employed in the form of generally elongated leaf springs.

The restraining means comprises, as best shown in FIG. 17, a generally elongated side leaf spring 81 secured at a generally intermediate portion thereof to a left side upright wall of the elevating table 40 by means of a set screw 85, and a similar rear left spring 82 secured at a generally intermediate portion thereof to a rear upright wall of the elevating table 40 by means of set screws 86. The side leaf spring 81, connected to the elevating table 40, has its opposite end portions bent so as to protrude towards and be held in contact with the left guide plate 13L of the chassis 13 and, similarly, the rear leaf spring 82 so connected to the elevating table 40 has its opposite end portions bent so as to protrude towards and be held in contact with a rear guide plate of the chassis 13. Thus, the side leaf spring 81 applies a resilient force to the elevating table 40 to urge the latter rightwards as viewed in FIG. 17 and the rear leaf spring 82 applies a resilient force to the elevating table 40 to urge the latter in a direction away from the rear guide wall of the chassis 13.

If the disc to be reproduced has a center hole slightly offset from the position where it ought to have occupied and/or has a bias in mass distribution, and considering that it is known that the centrifugal force developing in an element being rotated is of a magnitude generally proportional to the square of the speed at which the element is rotated, a relatively large centrifugal force will be developed in the disc when the latter is driven at a high speed. This centrifugal force tends to be transmitted through the turntable 83, then through the spindle drive motor 84 and finally through the clamp support plate or traverse plate 79 to the elevating table 40 which supports thereon the turntable 83, the spindle drive motor 84 and the traverse plate 79.

On the other hand, in the prior art disc changer, the clamping device and the elevating table 40 are so designed and so positioned as to be movable up and down relative to the chassis 13 with a gap present between the chassis 13 and the elevating table 40 so that one of the plural optical discs which is to be reproduced can be selected, and therefore, the presence of the gap tends to allow the elevating table 40 to undergo a repeated lateral displacement relative to the chassis 13 under the influence of such relatively large centrifugal force.

Accordingly, the present invention makes use of the side and rear leaf springs 81 and 82 to restrain the elevating table 40 from undergoing the repeated lateral displacement or quivering motion which would otherwise take place under the influence of the centrifugal force developing during the high speed rotation of the optical disc being reproduced. More specifically, the side and rear leaf springs 81 and 82 urges the elevating table 40 in respective directions sidewise towards the left guide plate 13L of the chassis 13 and also towards the rear guide plate of the chassis 13 to thereby substantially eliminate the gap which would otherwise allow the elevating table 40 to have some loose play. The magnitude of the resilient urging force exerted by each of the side and rear leaf springs 81 and 82 is preferably chosen to be higher than the centrifugal force which would be developed during rotation of the optical disc at the highest possible speed so that the quivering motion of the elevating table 40 relative to the chassis 13 can be minimized or substantially eliminated.

It is pointed out that even though the side and rear leaf springs 81 and 82 are employed in the manner described above, the elevating table 40 can smoothly undergo the angular movement about the common axis between the clamp support pins 78*a* and 78*b*.

Although the present invention has been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An optical disc drive apparatus which comprises:

a main tray having a stack of subtrays mounted thereon and movable between withdrawn and inserted positions, said stack of the subtrays being held at a stand-by position when the main tray is moved to the inserted position;

means for drawing an arbitrarily chosen one of the subtrays from the stand-by position towards a loaded position while the main tray is held at the inserted position;

an elevating table movable between lowered and elevated positions in a direction substantially perpendicular to a plane of rotation of the optical disc;

a traverse plate having front and rear ends opposite to each other and also having side walls opposite to each other, said traverse plate being carried by the elevating table at the front end of said elevating table and pivotable with its rear end angularly moved up and down;

a turntable rotatably mounted on the traverse plate for clamping the optical disc on the arbitrarily chosen subtray in cooperation with a clamping device;

a spindle drive motor mounted on the traverse plate and intervening between the turntable and the traverse plate for driving the turntable to rotate the optical disc;

said clamping device being carried by the elevating table and movable up and down within a chassis, which surrounds said clamping device and said traverse plate, for selecting one of the subtrays and also the optical disc resting on the selected subtray; and urging means for urging the elevating table towards the chassis in two directions perpendicular to each other.

2. The optical disc drive apparatus as claimed in claim 1, wherein said urging means comprises side and rear leaf springs each secured at a generally intermediate portion thereof to a different portion of the traverse plate, each of said side and rear leaf springs having opposite ends held in contact with a different portion of the chassis.

3. The optical disc drive apparatus as claimed in claim 1, wherein said traverse plate has left and right arms protruding outwardly from the front end thereof and pivotally connected to respective portions of the elevating table through associated pivot pins, said associated pivot pins defining an axis about which the traverse plate pivots.

4. The optical disc drive apparatus as claimed in claim 3, further comprising a clamp drive means disposed adjacent one of the opposite side walls of the traverse plate for driving the traverse plate to pivot about said axis, and a drive source for driving the clamp drive means, and wherein one of the associated pivot pins positioned on one side adjacent the clamp drive means is located at a level lower than that of the other of the associated pivot pins remote from the clamp drive means.

5. An optical disc drive apparatus comprising:

a main tray having a stack of subtrays mounted thereon and movable between a withdrawn position and an inserted position, said stack of subtrays being held at a stand-by position when said main tray is moved to the inserted position;

a device for drawing a selected one of said subtrays from the stand-by position towards a loaded position while said main tray is held at the inserted position;

an elevating table having a front end and being movable between lowered and elevated positions in a direction substantially perpendicular to a plane of rotation of an optical disc;

a traverse plate having a front end, a rear end, and side walls disposed opposite to each other, said traverse plate being carried by said elevating table at the front end of said elevating table and being pivotable such that the rear end of said traverse plate moves angularly up and down;

a clamping device carried by said elevating table;

a chassis surrounding said clamping device and said traverse plate;

a turntable rotatably mounted on said traverse plate for clamping the optical disc on the selected subtray in cooperation with said clamping device;

a spindle drive motor mounted on said traverse plate and disposed between said turntable and said traverse plate for driving said turntable in order to rotate the optical disc;

a first biasing structure secured to a side wall of said elevating table and contacting said chassis so as to bias said elevating table in a first direction; and a second biasing structure secured to a rear upright wall of said elevating table and contacting said chassis so as to bias said elevating table in a second direction, wherein the first direction is perpendicular with respect to the second direction.

6. The optical disc drive apparatus as claimed in claim 5, wherein:

said first biasing structure comprises a first leaf spring having an intermediate portion secured to said elevating table and opposite ends protruding outwardly from said elevating table and into contact with said chassis; and said second biasing structure comprises a second leaf spring having an intermediate portion, secured to said elevating table, and opposite ends protruding outwardly from said elevating table and into contact with said chassis.

7. The optical disc drive apparatus as claimed in claim 5, wherein said traverse plate has left and right arms protruding outwardly from the front end thereof, said left and right aris being pivotally connected to portions of said elevating table through pivot pins, respectively, wherein said pivot pins define an axis about which said traverse plate pivots.

8. The optical disc drive apparatus as claimed in claim 7, further comprising a clamp drive means disposed adjacent one of the opposite side walls of said traverse plate for driving said traverse plate such that it pivots about said axis, and a drive source for driving said clamp drive means, wherein one of said pivot pins is positioned adjacent said clamp drive means and is located at a level which is lower than a level at which said other pivot pin is positioned.

* * * * *